United States Patent
Rofougaran et al.

(10) Patent No.: US 8,731,604 B2
(45) Date of Patent: *May 20, 2014

(54) MULTI-MODE IC WITH MULTIPLE PROCESSING CORES

(75) Inventors: Ahmadreza (Reza) Rofougaran, Newport Coast, CA (US); Maryam Rofougaran, Rancho Palos Verdes, CA (US); Claude G. Hayek, Huntington Beach, CA (US); Frederic Christian Marc Hayem, San Diego, CA (US); Vafa James Rakshani, Newport Coast, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,029

(22) Filed: Sep. 13, 2012

(65) Prior Publication Data

US 2013/0003794 A1   Jan. 3, 2013

Related U.S. Application Data

(63) Continuation of application No. 12/315,312, filed on Aug. 23, 2011, now Pat. No. 8,306,569, which is a continuation of application No. 11/888,839, filed on Aug. 2, 2007, now Pat. No. 8,010,149.

(60) Provisional application No. 60/932,056, filed on May 29, 2007.

(51) Int. Cl.
*H04M 1/00* (2006.01)
*H04B 1/40* (2006.01)

(52) U.S. Cl.
CPC .................................... *H04B 1/406* (2013.01)
USPC ................. 455/550.1; 455/552.1; 455/553.1; 455/574

(58) Field of Classification Search
CPC ...................................................... H04B 1/406
USPC ............... 455/550.1, 552.1, 553.1, 574, 90.2
See application file for complete search history.

(56) References Cited

U.S. PATENT DOCUMENTS

| | | | | |
|---|---|---|---|---|
| 6,148,261 | A * | 11/2000 | Obradovich et al. | 701/438 |
| 6,825,827 | B2 * | 11/2004 | Miura | 345/98 |
| 6,873,608 | B1 * | 3/2005 | Plotnik et al. | 370/328 |
| 6,999,432 | B2 * | 2/2006 | Zhang et al. | 370/328 |
| 7,162,279 | B2 * | 1/2007 | Gupta | 455/574 |
| 7,251,500 | B2 * | 7/2007 | Nakagawa et al. | 455/556.1 |
| 7,444,168 | B2 * | 10/2008 | Nakagawa et al. | 455/557 |
| 7,529,565 | B2 * | 5/2009 | Hilpisch et al. | 455/569.1 |
| 7,610,017 | B2 * | 10/2009 | Girardeau et al. | 455/59 |

(Continued)

*Primary Examiner* — Duc M Nguyen
(74) *Attorney, Agent, or Firm* — Garlick & Markison; Kevin L. Smith

(57) ABSTRACT

An integrated circuit (IC) includes a first processing module that converts inbound data into an inbound digital audio signal and converts an outbound digital audio signal into outbound data. A second processing module performs a user application that includes at least one of generating of an inbound analog audio signal and generating an outbound analog audio signal. A third processing module performs an operating system algorithm to coordinate operation of at least one user application.

20 Claims, 14 Drawing Sheets

(56) References Cited

U.S. PATENT DOCUMENTS

| | | | |
|---|---|---|---|
| 7,738,913 B2* | 6/2010 | Hilpisch et al. | 455/550.1 |
| 7,774,017 B2* | 8/2010 | Irita et al. | 455/550.1 |
| 8,010,149 B2* | 8/2011 | Rofougaran et al. | 455/550.1 |
| 8,306,569 B2* | 11/2012 | Rofougaran et al. | 455/550.1 |
| 2005/0012811 A1* | 1/2005 | Nakagawa et al. | 348/14.02 |
| 2005/0063416 A1* | 3/2005 | Shin et al. | 370/465 |
| 2005/0180332 A1* | 8/2005 | Kim et al. | 370/244 |
| 2005/0232208 A1* | 10/2005 | Hansen | 370/338 |
| 2006/0025171 A1* | 2/2006 | Ly et al. | 455/553.1 |
| 2006/0160563 A1* | 7/2006 | Ku | 455/552.1 |
| 2006/0291544 A1* | 12/2006 | Fischer et al. | 375/219 |

* cited by examiner

MULTI-MODE IC WITH MULTIPLE PROCESSING CORES

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 13/215,312, entitled "MULTI-MODE IC WITH MULTIPLE PROCESSING CORES," filed Aug. 23, 2011, issued as U.S. Pat. No. 8,306,569, on Nov. 6, 2012, which claims priority pursuant to 35 U.S.C. §120, as a continuation, to the following U.S. Utility Patent Application, which is hereby incorporated herein by reference in its entirety and made part of the present U.S. Utility Patent Application for all purposes:

2. U.S. Utility application Ser. No. 11/888,839, entitled "MULTI-MODE IC WITH MULTIPLE PROCESSING CORES," filed Aug. 2, 2007, issued as U.S. Pat. No. 8,010,149, on Aug. 30, 2011, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/932,056, entitled "MULTI-MODE IC WITH MULTIPLE PROCESSING CORES," filed May 29, 2007.

TECHNICAL FIELD

This invention relates generally to wireless communication systems and more particularly to integrated circuits of transceivers operating within such systems.

DESCRIPTION OF RELATED ART

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As is generally known, transceivers, such as the ones described above, are in the physical (PHY) layer of the communication stack. The other layers include medium access control (MAC) layer, network layer, transport layer, session layer, presentation layer, and application layer. For a host communication device to support a wireless communication, it includes firmware to process each of these layers and also includes firmware to process an operating system and user applications (e.g., digital camera, email, web browsing, voice recorder). Such a communication device includes multiple integrated circuits to support these various functions. For instance, an IC may be used to provide the RF portion of the PHY layer, another IC may be a digital signal processor (DSP) to support the baseband PHY layer and audio codec functions, yet another IC for supporting the lower layers of the communication stack (e.g., MAC, network and transport), while a different IC supports the upper layers of the communication stack, the operating system, and the user applications. Typically, the IC supporting the upper layers of the communication stack, the operating system, and the user applications is a high speed, high power microprocessor to provide a desired level of performance.

In recent technological advancements, a multiple function processing core of a DSP for the baseband PHY layer and audio codec functions, a first microprocessor for the lower layers, and a second microprocessor the upper layers, the operating system, and the user applications has been implemented in a single IC package. While this implementation provides greater integration, it has relatively high power consumption.

Despite the recent technological advancements discussed above, there is a continued desire for wireless communication devices to support multiple standards, for further integration, and for decreased power consumption. However, such desires have gone unrealized when it comes to implementing baseband and RF on the same chip for multiple wireless communication standards with the upper layers of the communication stack, the operating system and the user applications in a power efficient IC.

Therefore, a need exists for an integrated circuit (IC) that implements baseband and RF of multiple wireless communication standards on the same IC die with the upper layers of the communication stack, the operating system and the user applications in a power efficient IC.

DETAILED DESCRIPTION OF THE DRAWINGS

Figure 1:
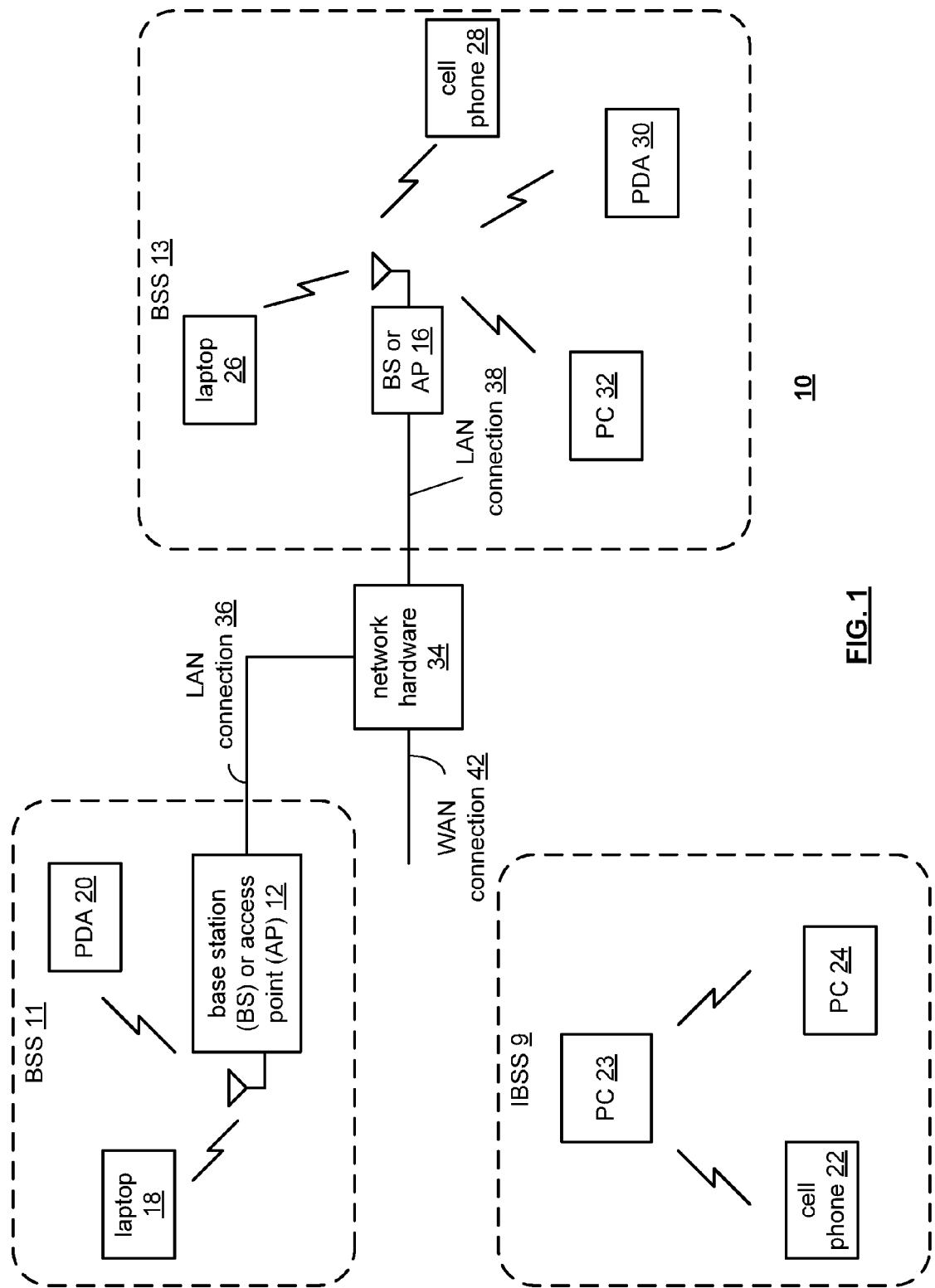
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera, provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to one or more of FIGS. 2-23.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
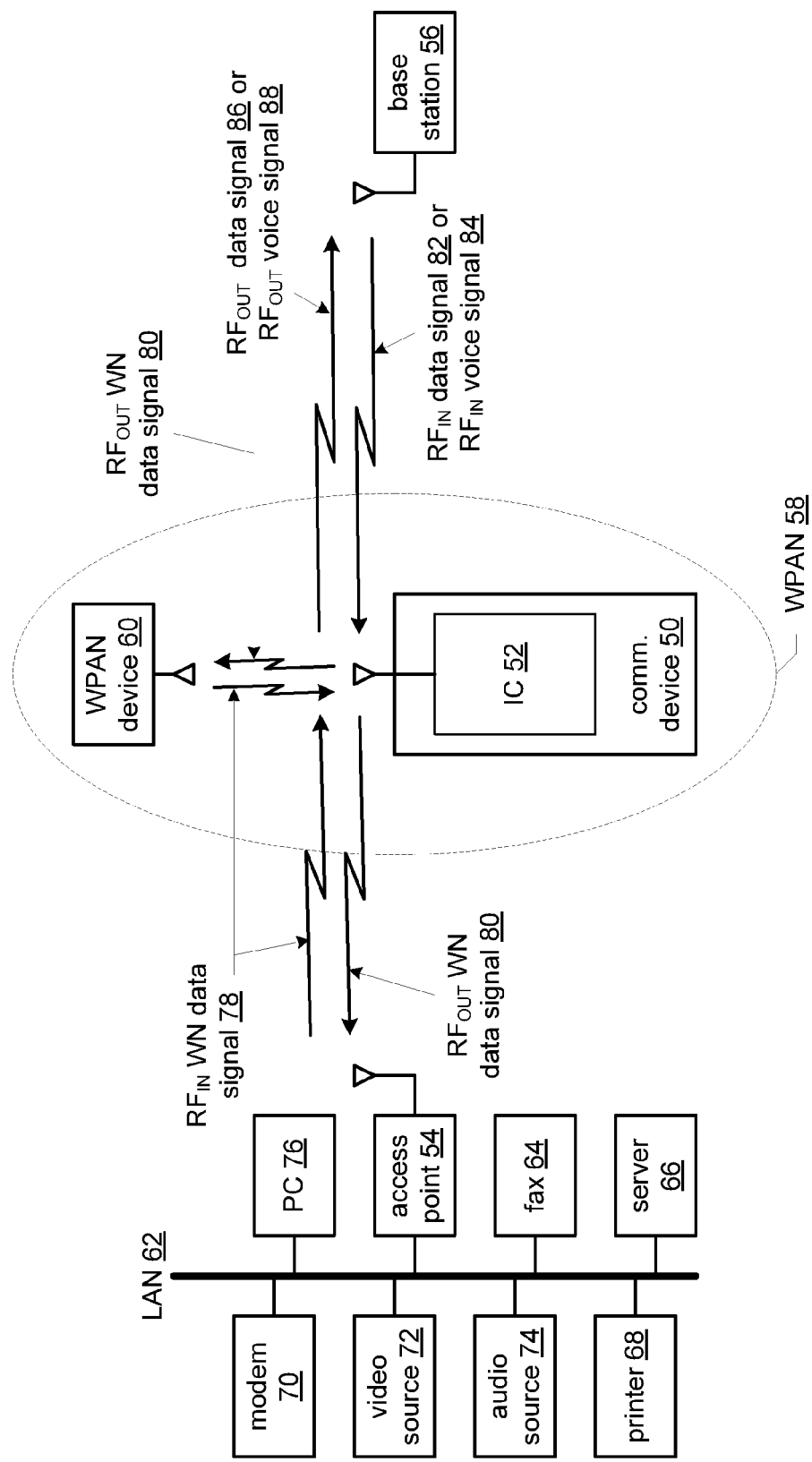
FIG. 2 is a schematic block diagram of another embodiment of a wireless communication system in accordance with the present invention.

FIG. 2 is a schematic block diagram of another embodiment of a wireless communication system that includes a communication device 50 associated with a cellular network, a wireless local area network (WLAN) and/or a wireless personal area network (WPAN) 58. The WLAN network is shown to include an access point 54, a local area network (LAN) bus 62, a modem 70, a video source 72, an audio source 74, a printer 68, a personal computer (PC) 76, a facsimile machine (fax) 64, and a server 66, but may include more or less components than shown. The cellular network is shown to include a base station 56, which may support voice communications and/or data communications. Note that the cellular network may include more components than the base station 56. The WPAN 58 includes at least one WPAN device 60 that is proximal to the communication device 50. Note that the WPAN device 60 may be a Bluetooth headset, a wireless microphone, a wireless speaker, a wireless display, and/or a wireless data entry unit.

In this embodiment, the communication device 50, which may be one of the communication devices 18-32 of FIG. 1 or another type of communication device, includes an integrated circuit (IC) 52 to communication with the cellular network, the WLAN, and/or the WPAN. Such a communication may include voice communications, audio communications, video communications, graphics communications, text communications, and/or data communications (e.g., emails, web browsing, short message services, etc.). For example, the communication device 50 may be receiving an audio file from the audio source 74 (e.g., a computer storing an MP3 file, a radio receiver, a cable set top box, a satellite receiver, a CD player, etc.), the server 66, and/or the PC 76 via the access point 54 as an inbound RF wireless network (WN) data signal 78. The IC 52 processes the inbound RF WN data signal 78 to produce inbound data that may be rendered audible by speaker circuitry of the IC 52 and/or communication device 50. Alternatively and/or in addition to, the IC 52 may convert the inbound data signal from the WLAN to an outbound RF WN data signal 80 that is provided to the WPAN device 60, which may reproduce the inbound data for presentation (e.g., render it audible).

As another example, the communication device 50 may be receiving a video file from the video source 72 (e.g., a computer storing a video file, a cable set top box, a satellite receiver, a DVD player, etc.), the server 66, and/or the PC 76 via the access point 54 as an inbound RF WN data signal 78. The IC 52 processes the inbound RF WN data signal 78 to produce inbound data that may be presented on a display (e.g., speakers and LCD, DLP, or plasma display panel) of the communication device 50. Alternatively and/or in addition to, the IC 52 may convert the inbound data signal from the WLAN to an outbound RF WN data signal 80 that is provided to the WPAN device 60, which may reproduce the inbound data for presentation (e.g., play the video file).

As yet another example, the communication device 50 may record video, voice, and/or audio to produce a recorded file. In this example, the IC 52 may convert the recorded file into an outbound RF WN data signal 80 that is provided to the WLAN. The access point 54 recovers the recorded file and provides it to one of the other devices (e.g., PC 76, server 66, modem 70) for storage and/or forwarding onto the Internet.

As a further example, the modem 70, the PC 76, the server 66, the fax 64, and/or the printer 68 may provide a file to the access point 54 for communication to the communication device 50. In this instance, the access point 54 converts the file into the inbound WN data signal 78. The IC 52 processes the received the inbound WN data signal 78 to recapture the file, which may be presented on the communication device 50 and/or provided to the WPAN device 60.

As yet a further example, the communication device 50 may have a graphics, text, and/or a data file for communication to a component of the WLAN. In this example, the IC 52 converts the graphics, text, and/or data file into the outbound RF WN data signal 80 that is provided to the access point 54 and/or to the WPAN 60. In one embodiment, the access point 54 recovers the graphics, text, and/or data file and provides it to the PC 76, the modem 70, the fax 64, the printer 68, and/or the server 66. Note that the file may include an address that identifies which component(s) of the WLAN are to receive the file.

More examples include voice and/or data communications between the communication device 50 and the base station 56 in accordance with one or more cellular communication standards, which includes, but is not limited to, past, present, and/or future versions of GSM, CDMA, wideband CDMA (WCDMA), EDGE, GPRS, AMPS, and digital AMPS. For instance, the IC 52 may process outbound voice signals to produce outbound RF voice signals 88 and process inbound RF voice signals 84 to produce inbound voice signals. The IC 52 may facilitate the presentation of the inbound and outbound voice signals on the communication device 50 and/or transceive them with the WPAN device 60 as the inbound and outbound WN data signals 78 and 80. Further the IC 52 may process outbound data signals to produce outbound RF data signals 86 and process inbound RF data signals 82 to produce inbound data signals. The IC 52 may facilitate the presentation of the inbound and outbound data signals on the communication device 50 and/or transceive them with the WPAN device 60 as the inbound and outbound WN data signals 78 and 80.

Figure 3:
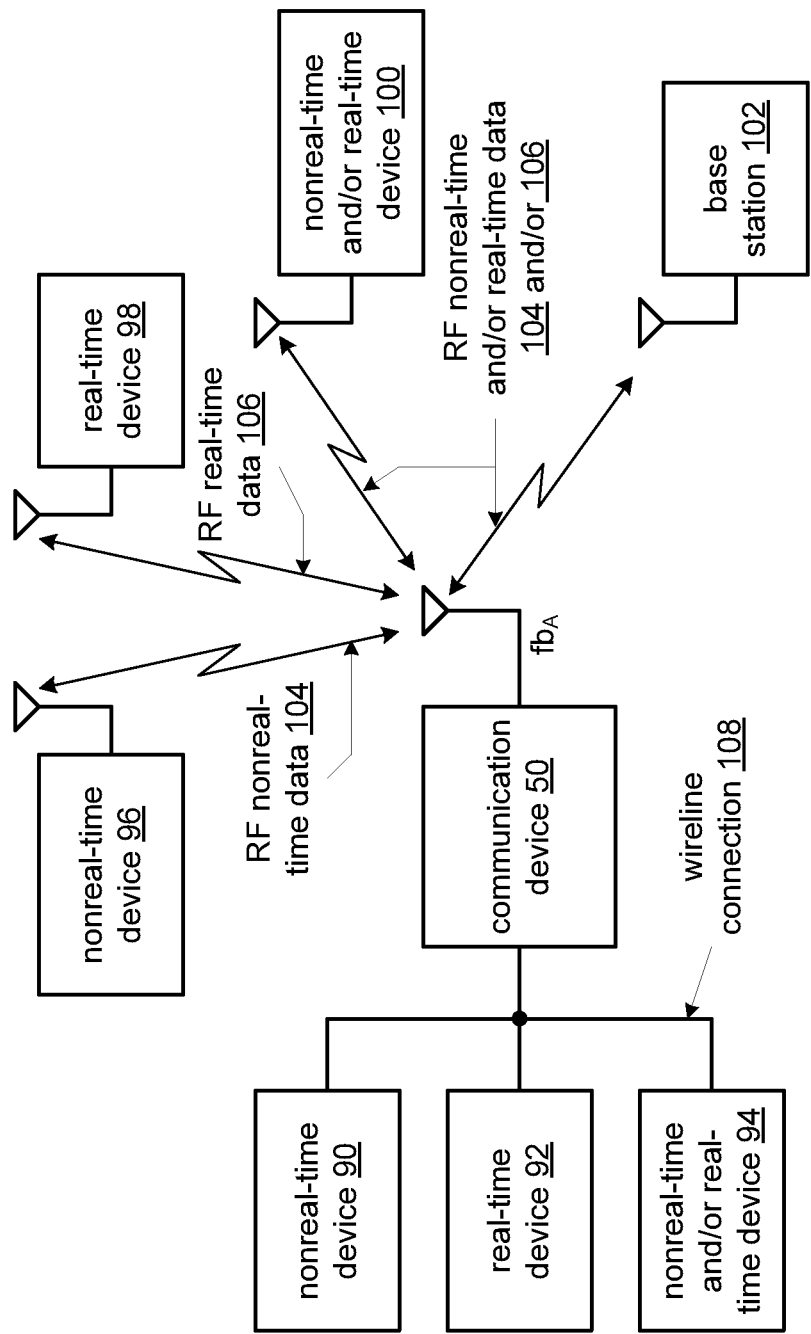
FIG. 3 is a schematic block diagram of a wireless communication environment in accordance with the present invention.

FIG. 3 is a schematic block diagram of a wireless communication environment that includes a communication device 50 communicating with one or more of a wireline non-real-time device 90, a wireline real-time device 92, a wireline non-real-time and/or real-time device 94, a base station 102, a wireless non-real-time device 96, a wireless real-time device 98, and a wireless non-real-time and/or real-time device 100. The communication device 50, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 90, the wireline real-time device 92, and the wireline non-real-time and/or real-time device 94 via a wireless connection 108. The wireless connection 108 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 50 communicates RF non-real-time data 104 and/or RF real-time data 106 with one or more of the base station 102, the wireless non-real-time device 96, the wireless real-time device 98, and the wireless non-real-time and/or real-time device 100 via one or more channels in a frequency band ($fb_A$) that is designated for wireless communications. For example, the frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11 (g) utilizes a frequency band of 2.4 GHz frequency band.

The wireless real-time device 98 and the wireline real-time device 92 communicate real-time data that, if interrupted, would result in a noticeable adverse affect. For example, real-time data may include, but is not limited to, voice data, audio data, and/or streaming video data. Note that each of the real-time devices 98 and 92 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 96 and the wireline non-real-time device 90 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 96 and 90 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 50, the communication unit 50 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 4:
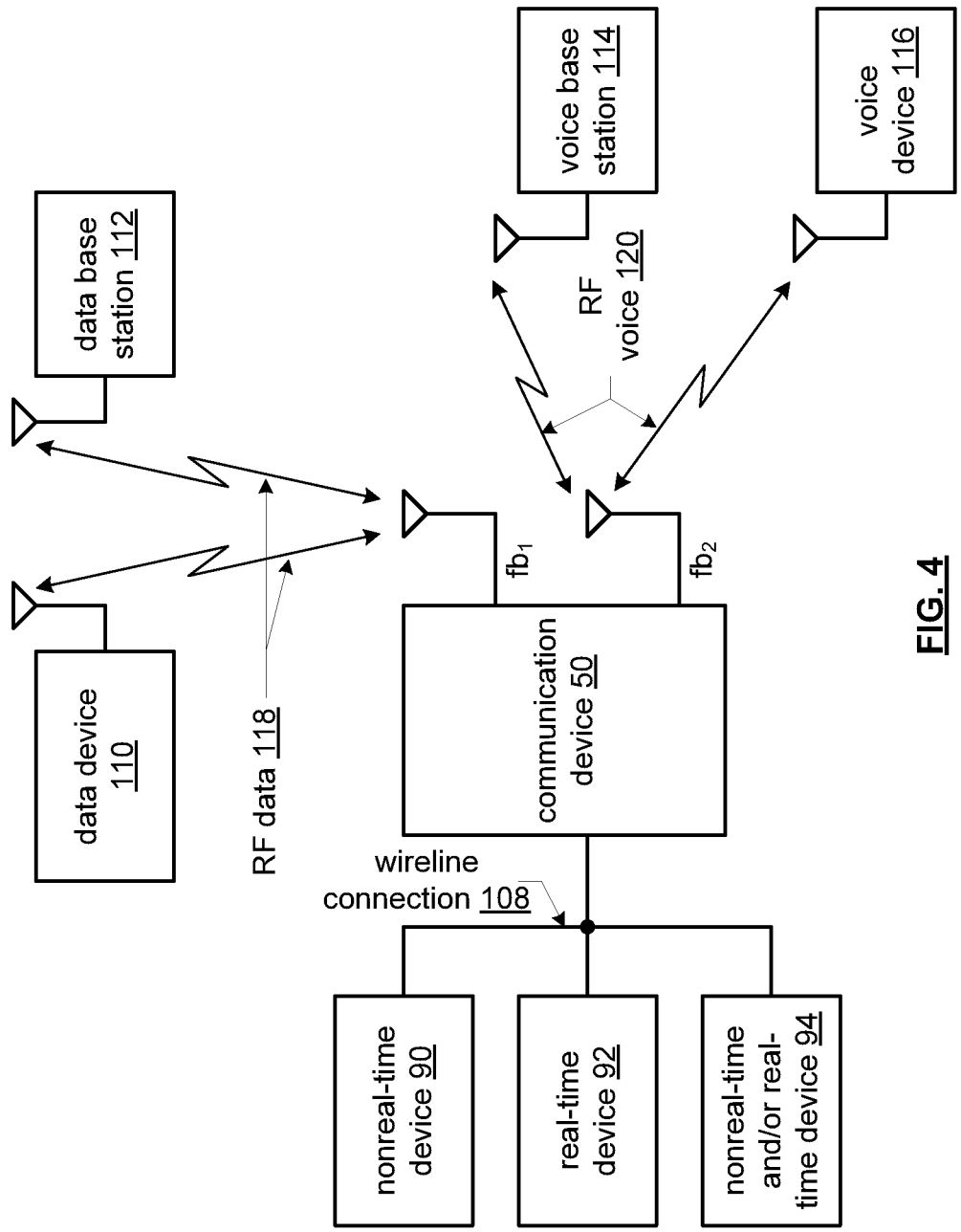
FIG. 4 is a schematic block diagram of another wireless communication environment in accordance with the present invention.

FIG. 4 is a schematic block diagram of another wireless communication environment that includes a communication device 50 communicating with one or more of the wireline non-real-time device 90, the wireline real-time device 92, the wireline non-real-time and/or real-time device 94, a wireless data device 110, a data base station 112, a voice base station 114, and a wireless voice device 116. The communication device 50, which may be a personal computer, laptop computer, personal entertainment device, cellular telephone, personal digital assistant, a game console, a game controller, and/or any other type of device that communicates data and/or voice signals, may be coupled to one or more of the wireline non-real-time device 90, the wireline real-time device 92, and the wireline non-real-time and/or real-time device 94 via the wireless connection 108.

The communication device 50 communicates RF data 118 with the data device 110 and/or the data base station 112 via one or more channels in a first frequency band ($fb_1$) that is designated for wireless communications. For example, the first frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries.

The communication device 50 communicates RF voice 120 with the voice device 116 and/or the voice base station 114 via one or more channels in a second frequency band ($fb_2$) that is designated for wireless communications. For example, the second frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. In a particular example, the first frequency band may be 900 MHz for EDGE data transmissions while the second frequency band may the 1900 MHz and 2100 MHz for WCDMA voice transmissions.

The voice device 114 and the voice base station 116 communicate voice signals that, if interrupted, would result in a noticeable adverse affect (e.g., a disruption in a communication). For example, the voice signals may include, but is not limited to, digitized voice signals, digitized audio data, and/or streaming video data. Note that the voice device 38 may be a personal computer, laptop computer, personal digital assistant, a cellular telephone, a game console, a wireless local area network (WLAN) transceiver, a Bluetooth transceiver, a frequency modulation (FM) tuner, a broadcast television tuner, a digital camcorder, and/or any other device that has a wireless interface for conveying voice signals with another device.

The data device 110 and the data base station 112 communicate data that, if interrupted, would not generally result in a noticeable adverse affect. For example, the data may include, but is not limited to, text messages, still video images, graphics, control data, emails, and/or web browsing. Note that the data device 110 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireless interface for conveying data with another device.

Depending on the devices coupled to the communication unit 50, the communication unit 50 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 5:
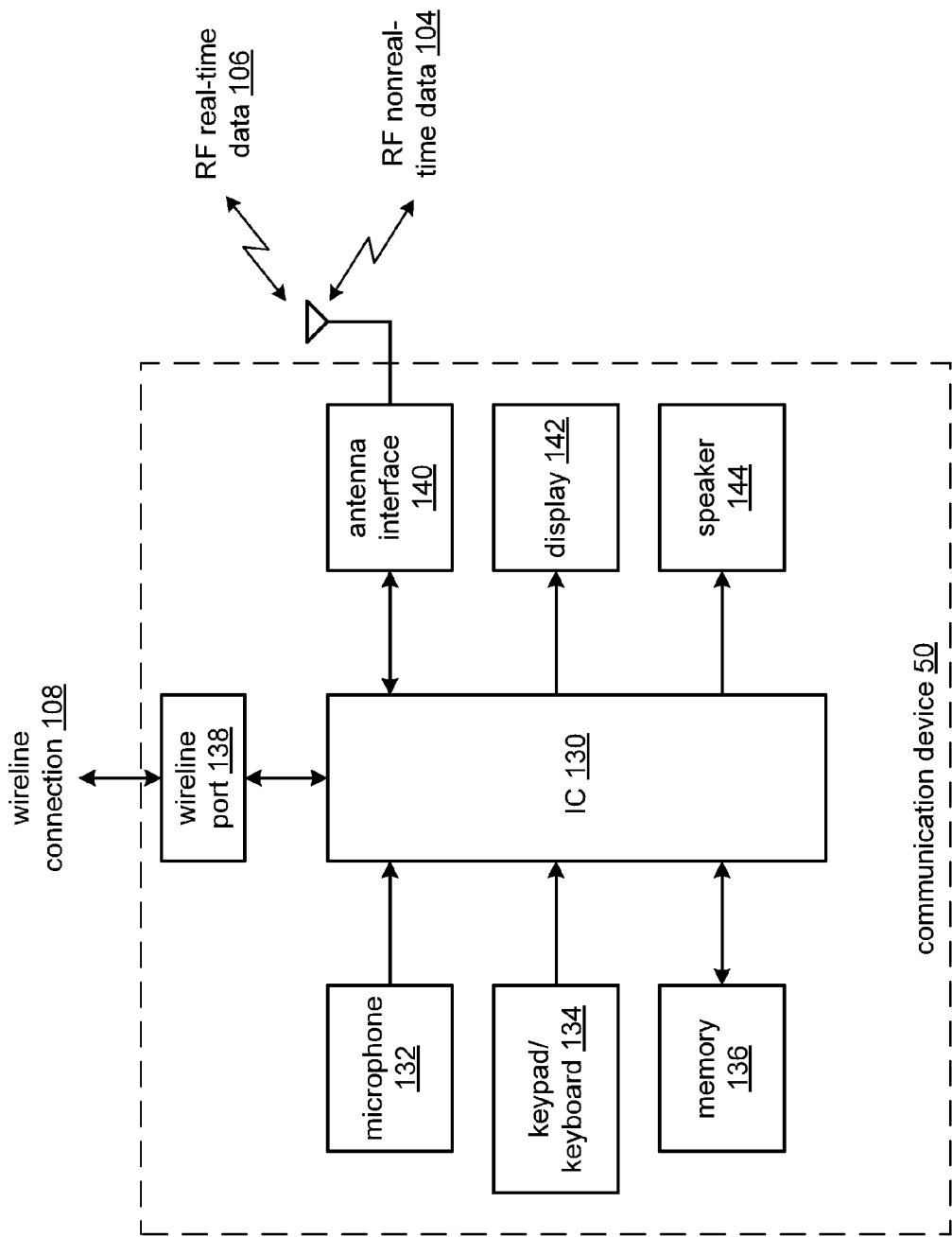
FIG. 5 is a schematic block diagram of an embodiment of a communication device in accordance with the present invention.

FIG. 5 is a schematic block diagram of an embodiment of a communication device 50 that includes an IC (integrated circuit) 130, an antenna interface 140, memory 136, a display 142, a keypad and/or key board 134, at least one microphone 132, at least one speaker 144, and a wireline port 138. The memory 136 may be NAND flash, NOR flash, SDRAM, and/or SRAM for storing data and/or instructions to facilitate communications of real-time and non-real-time data via the wireline port 138 and/or via the antenna interface 140. In addition, or in the alternative, the memory 136 may store video files, audio files, and/or image files for subsequent wireline or wireless transmission, for subsequent display, for file transfer, and/or for subsequent editing. Accordingly, when the communication device supports storing, displaying, transferring, and/or editing of audio, video, and/or image files, the memory 136 would further store algorithms to support such storing, displaying, and/or editing. For example, the algorithms may include, but is not limited to, file transfer algorithm, video compression algorithm, video decompression algorithm, audio compression algorithm, audio decompression algorithm, image compression algorithm, and/or image decompression algorithm, such as MPEG (motion picture expert group) encoding, MPEG decoding, JPEG (joint picture expert group) encoding, JPEG decoding, MP3 encoding, and MP3 decoding.

For outgoing voice communications, the at least one microphone 132 receives an audible voice signal, amplifies it, and provide the amplified voice signal to the IC 130. The IC 130 processes the amplified voice signal into a digitized voice signal using one or more audio processing schemes (e.g., pulse code modulation, audio compression, etc.). The IC 130 may transmit the digitized voice signal via the wireless port 138 to the wireline real-time device 92 and/or to the wireline non-real-time and/or real-time device 94. In addition to, or in the alternative, the IC 130 may transmit the digitized voice signal as RF real-time data 106 to the wireless real-time device 98, and/or to the wireless non-real-time and/or real-time device 100 via the antenna interface 140.

For outgoing real-time audio and/or video communications, the IC 130 retrieves an audio and/or video file from the memory 136. The IC 130 may decompress the retrieved audio and/or video file into digitized streaming audio and/or video. The IC 130 may transmit the digitized streaming audio and/or video via the wireless port 138 to the wireline real-time device 92 and/or to the wireline non-real-time and/or real-time device 94. In addition to, or in the alternative, the IC 130 may transmit the digitized streaming audio and/or video as RF real-time data 106 to the wireless real-time device 98, and/or to the wireless non-real-time and/or real-time device 100 via the antenna interface 140. Note that the IC 130 may mix a digitized voice signal with a digitized streaming audio and/or video to produce a mixed digitized signal that may be transmitted via the wireline port 138 and/or via the antenna interface 140.

In a playback mode of the communication device 50, the IC 130 retrieves an audio and/or video file from the memory 136. The IC 130 may decompress the retrieved audio and/or video file into digitized streaming audio and/or video. The IC 130 may convert an audio portion of the digitized streaming audio and/or video into analog audio signals that are provided to the at least one speaker 144. In addition, the IC 130 may convert a video portion of the digitized streaming audio and/or video into analog or digital video signals that are provided to the display 142, which may be a liquid crystal (LCD) display, a plasma display, a digital light project (DLP) display, and/or any other type of portable video display.

For incoming RF voice communications, the antenna interface 140 receives, via an antenna, inbound RF real-time data 106 (e.g., inbound RF voice signals) and provides them to the IC 130. The IC 130 processes the inbound RF voice signals into digitized voice signals. The IC 130 may transmit the digitized voice signals via the wireless port 138 to the wireline real-time device 92 and/or to the wireline non-real-time and/or real-time device 94. In addition to, or in the alternative, the IC 130 may convert the digitized voice signals into an analog voice signals and provide the analog voice signals to the speaker 144.

The IC 130 may receive digitized voice-audio-and/or-video signals from the wireline connection 108 via the wireless port 138 or may receive RF signals via the antenna interface 140, where the IC 130 recovers the digitized voice-audio-and/or-video signals from the RF signals. The IC 130 may then compress the received digitized voice-audio-and/or-video signals to produce voice-audio-and/or-video files and store the files in memory 136. In the alternative, or in addition to, the IC 130 may convert the digitized voice-audio-and/or-video signals into analog voice-audio-and/or-video signals and provide them to the speaker 144 and/or to the display 142.

For outgoing non-real-time data communications, the keypad/keyboard 134 (which may be a keypad, keyboard, touch screen, voice activated data input, and/or any other mechanism for inputted data) provides inputted data (e.g., emails, text messages, web browsing commands, etc.) to the IC 130. The IC 130 converts the inputted data into a data symbol stream using one or more data modulation schemes (e.g., QPSK, 8-PSK, etc.). The IC 130 converts the data symbol stream into RF non-real-time data signals 104 that are provided to the antenna interface 140 for subsequent transmission via the antenna. In addition to, or in the alternative, the IC 130 may provide the inputted data to the display 142. As another alternative, the IC 130 may provide the inputted data to the wireline port 138 for transmission to the wireline non-real-time data device 90 and/or the non-real-time and/or real-time device 94.

For incoming non-real-time communications (e.g., text messaging, image transfer, emails, web browsing), the antenna interface 140 receives, via an antenna, inbound RF non-real-time data signals 104 (e.g., inbound RF data signals) and provides them to the IC 130. The IC 130 processes the inbound RF data signals into data signals. The IC 130 may transmit the data signals via the wireless port 138 to the wireline non-real-time device 90 and/or to the wireline non-real-time and/or real-time device 94. In addition to, or in the alternative, the IC 130 may convert the data signals into analog data signals and provide the analog data signals to an analog input of the display 142 or the IC 130 may provide the data signals to a digital input of the display 142.

Figure 6:
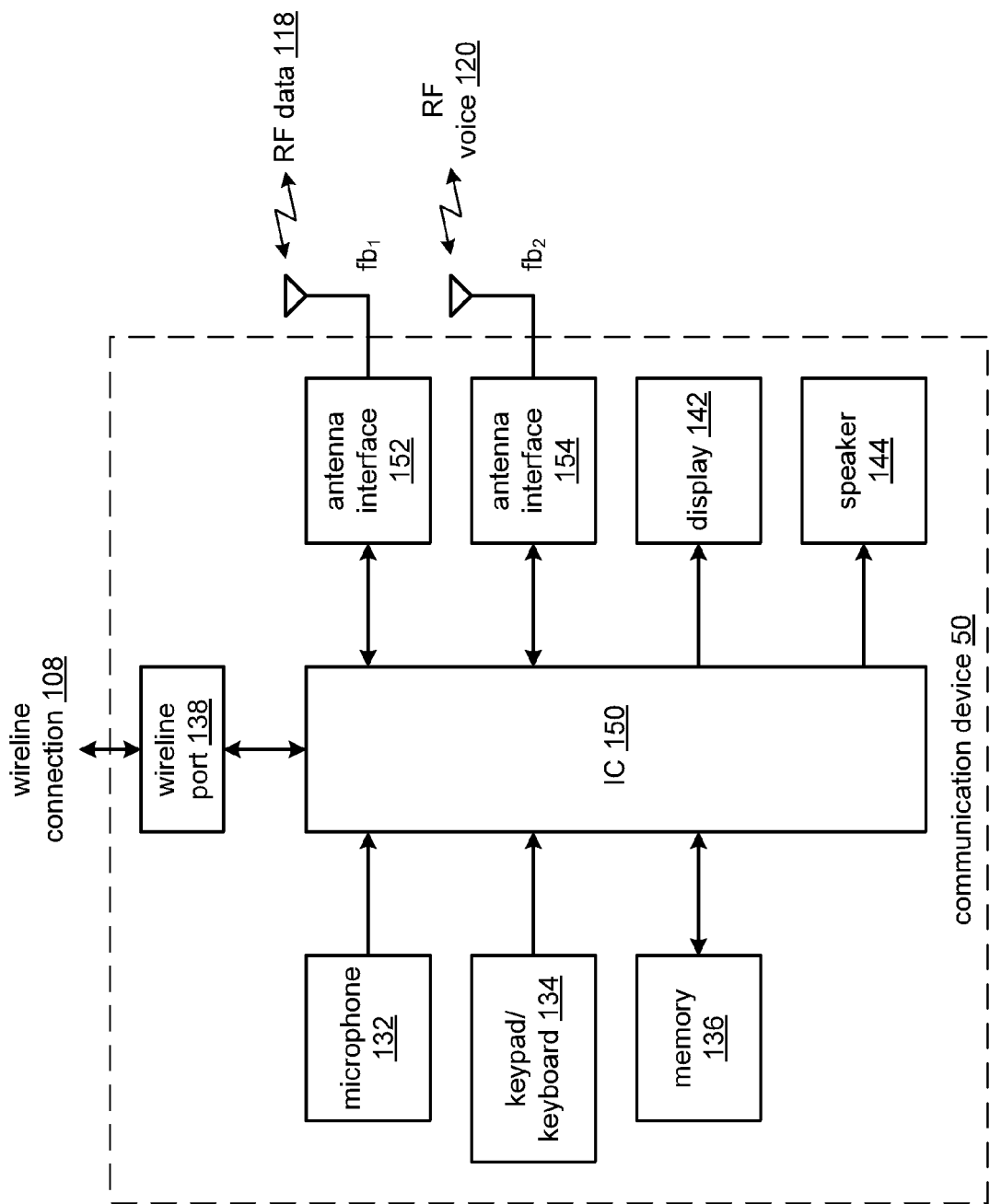
FIG. 6 is a schematic block diagram of another embodiment of a communication device in accordance with the present invention.

FIG. 6 is a schematic block diagram of another embodiment of a communication device 50 that includes an IC (integrated circuit) 1500, a first antenna interface 152, a second antenna interface 154, memory 136, the display 142, the keypad and/or key board 134, the at least one microphone 132, the at least one speaker 144, and the wireline port 138. The memory 136 may be NAND flash, NOR flash, SDRAM, and/or SRAM for storing data and/or instructions to facilitate communications of real-time and non-real-time data via the wireline port 138 and/or via the antenna interfaces 152 and/or 154. In addition, or in the alternative, the memory 136 may store video files, audio files, and/or image files for subsequent wireline or wireless transmission, for subsequent display, for file transfer, and/or for subsequent editing. Accordingly, when the communication device 50 supports storing, displaying, transferring, and/or editing of audio, video, and/or image files, the memory 136 would further store algorithms to support such storing, displaying, and/or editing. For example, the algorithms may include, but are not limited to, file transfer algorithm, video compression algorithm, video decompression algorithm, audio compression algorithm, audio decompression algorithm, image compression algorithm, and/or image decompression algorithm, such as MPEG (motion picture expert group) encoding, MPEG decoding, JPEG (joint picture expert group) encoding, JPEG decoding, MP3 encoding, and MP3 decoding.

For outgoing voice communications, the at least one microphone 132 receives an audible voice signal, amplifies it, and provide the amplified voice signal to the IC 150. The IC 150 processes the amplified voice signal into a digitized voice signal using one or more audio processing schemes (e.g., pulse code modulation, audio compression, etc.). The IC 150 may transmit the digitized voice signal via the wireless port 138 to the wireline real-time device 92 and/or to the wireline non-real-time and/or real-time device 94. In addition to, or in the alternative, the IC 150 may transmit the digitized voice signal as RF real-time data 106 to the wireless real-time device 98, and/or to the wireless non-real-time and/or real-time device 100 via the antenna interface 152 using a first frequency band ($fb_1$).

For outgoing real-time audio and/or video communications, the IC 150 retrieves an audio and/or video file from the memory 136. The IC 150 may decompress the retrieved audio and/or video file into digitized streaming audio and/or video. The IC 150 may transmit the digitized streaming audio and/or video via the wireless port 138 to the wireline real-time device 92 and/or to the wireline non-real-time and/or real-time device 94. In addition to, or in the alternative, the IC 150 may transmit the digitized streaming audio and/or video as RF real-time data 106 to the wireless real-time device 98, and/or to the wireless non-real-time and/or real-time device 10 via the antenna interface 152 using the first frequency band ($fb_1$). Note that the IC 150 may mix a digitized voice signal with a digitized streaming audio and/or video to produce a mixed digitized signal that may be transmitted via the wireline port 138 and/or via the antenna interface 152.

In a playback mode of the communication device 50, the IC 150 retrieves an audio and/or video file from the memory 136. The IC 150 may decompress the retrieved audio and/or video file into digitized streaming audio and/or video. The IC 150 may convert an audio portion of the digitized streaming audio and/or video into analog audio signals that are provided to the at least one speaker 144. In addition, the IC 150 may convert a video portion of the digitized streaming audio and/or video into analog or digital video signals that are provided to the display 142, which may be a liquid crystal (LCD) display, a plasma display, a digital light project (DLP) display, and/or any other type of portable video display.

For incoming RF voice communications, the antenna interface 152 receives, via an antenna within the first frequency band, inbound RF real-time data 106 (e.g., inbound RF voice signals) and provides them to the IC 150. The IC 150 processes the inbound RF voice signals into digitized voice signals. The IC 150 may transmit the digitized voice signals via the wireless port 138 to the wireline real-time device 92 and/or to the wireline non-real-time and/or real-time device 94. In addition to, or in the alternative, the IC 150 may convert the digitized voice signals into an analog voice signals and provide the analog voice signals to the speaker 144.

The IC 150 may receive digitized voice-audio-and/or-video signals from the wireline connection 108 via the wireless port 138 or may receive RF signals via the antenna interface 152, where the IC 150 recovers the digitized voice-audio-and/or-video signals from the RF signals. The IC 150 may then compress the received digitized voice-audio-and/or-video signals to produce voice-audio-and/or-video files and store the files in memory 136. In the alternative, or in addition to, the IC 150 may convert the digitized voice-audio-and/or-video signals into analog voice-audio-and/or-video signals and provide them to the speaker 144 and/or to the display 142.

For outgoing non-real-time data communications, the keypad/keyboard 134 provides inputted data (e.g., emails, text messages, web browsing commands, etc.) to the IC 150. The IC 150 converts the inputted data into a data symbol stream using one or more data modulation schemes (e.g., QPSK, 8-PSK, etc.). The IC 150 converts the data symbol stream into RF non-real-time data signals 104 that are provided to the antenna interface 154 for subsequent transmission via an antenna in a second frequency band ($fb_2$). In addition to, or in the alternative, the IC 150 may provide the inputted data to the display 142. As another alternative, the IC 150 may provide the inputted data to the wireline port 138 for transmission to the wireline non-real-time data device 90 and/or the non-real-time and/or real-time device 94.

For incoming non-real-time communications (e.g., text messaging, image transfer, emails, web browsing), the antenna interface 154 receives, via an antenna within the second frequency band, inbound RF non-real-time data signals 104 (e.g., inbound RF data signals) and provides them to the IC 150. The IC 150 processes the inbound RF data signals into data signals. The IC 150 may transmit the data signals via the wireless port 138 to the wireline non-real-time device 90 and/or to the wireline non-real-time and/or real-time device 94. In addition to, or in the alternative, the IC 150 may convert the data signals into analog data signals and provide the analog data signals to an analog input of the display 142 or the IC 150 may provide the data signals to a digital input of the display 142.

Figure 7:
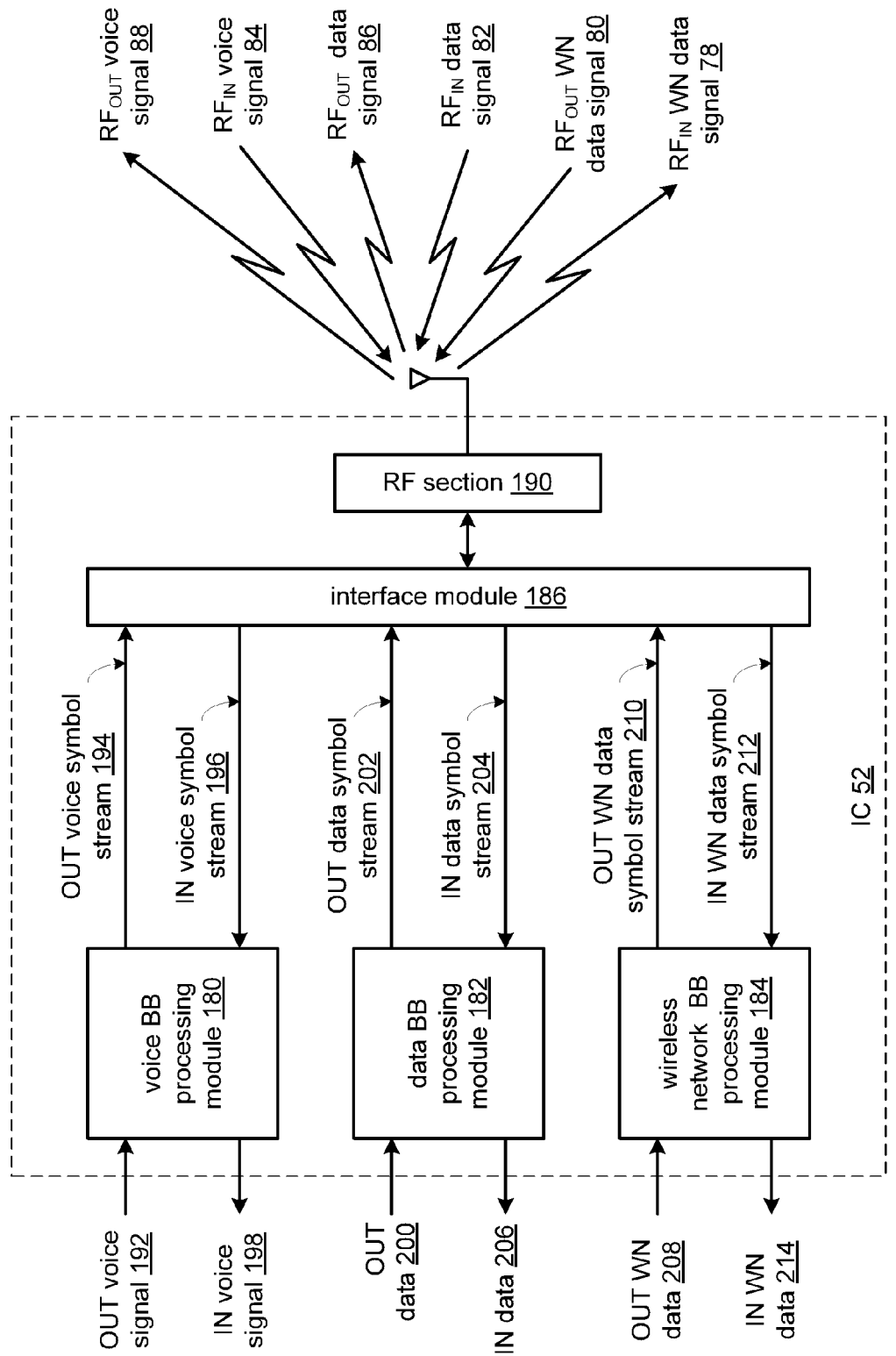
FIG. 7 is a schematic block diagram of an embodiment of an integrated circuit in accordance with the present invention.

FIG. 7 is a schematic block diagram of an embodiment of an integrated circuit (IC) 52 that includes a voice baseband (BB) processing module 180, a data BB processing module 182, a wireless network BB processing module 184, an interface module 186, and a radio frequency (RF) section 190. The BB processing modules 180-184 may be separate processing modules and/or shared processing modules, where a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module(s) may have an associated memory and/or memory element, which may be a single memory device, a plurality of memory devices, and/or embedded circuitry of the processing module(s). Such a memory device may be a read-only memory, random access memory, volatile memory, non-volatile memory, static memory, dynamic memory, flash memory, cache memory, and/or any device that stores digital information. Note that when the processing module(s) implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module(s) executes, hard coded and/or operational instructions corresponding to at least some of the steps and/or functions illustrated in FIGS. 2-23.

In an embodiment, the voice baseband processing module 180 is coupled to convert an outbound voice signal 192 into an outbound voice symbol stream 194 and to convert an inbound voice symbol stream 196 into an inbound voice signal 198 in accordance with a cellular voice protocol (e.g., past, present, or future versions of GSM, AMPS, CDMA, WCDMA, etc.). The data baseband processing module 182 is coupled to convert outbound data 200 into an outbound data symbol stream 202 and to convert an inbound data symbol stream 204 into inbound data 206 in accordance with a cellular data protocol (e.g., past, present, or future versions of EDGE, GPRS, HSDPA, HSUPA, etc.).

The wireless network baseband processing module 184 is coupled to convert outbound wireless network data 208 into an outbound wireless network data symbol stream 210 and to convert an inbound wireless network data symbol stream 210 into inbound wireless network data 212 in accordance with a wireless network protocol (e.g., past, present, or future versions of Bluetooth, IEEE 802.11, ZIGBEE, RFID, etc.). In one embodiment, the wireless network baseband processing module 184 converts the outbound wireless network data 208 into the outbound wireless network data symbol stream 210 and converts the inbound wireless network data symbol stream 212 into the inbound wireless network data 214 in accordance with a wireless local area network (WLAN) protocol. In another embodiment, the wireless network baseband processing module 184 converts the outbound wireless network data 208 into the outbound wireless network data symbol stream 210 and converts the inbound wireless network data symbol stream 212 into the inbound wireless network data 214 in accordance with a wireless personal area network (WPAN), a near field communication protocol, and/or a far field communication protocol.

The interface module 186, which may be implemented as described in co-pending patent application entitled VOICE/DATA/RF INTEGRATED CIRCUIT, having a filing date of Dec. 19, 2006, and a Ser. No. 11/641,999, provides coupling between the baseband processing modules 180-184 and the RF section 190. For instance, the interface module 186 conveys the inbound voice symbol stream 196 and the outbound voice symbol stream 194 between the voice baseband processing module 180 and the RF section 190. In addition, the interface module 186 conveys the inbound data symbol stream 204 and the outbound data symbol stream 202 between the data baseband processing module 182 and the RF section 190. Further, the interface module 186 conveys the inbound wireless network data symbol stream 212 and the outbound wireless network data symbol stream 210 between the wireless network baseband processing module 184 and the RF section 190.

The RF section 190 is coupled to convert an inbound RF voice signal 84 into the inbound voice symbol stream 196 and to convert the outbound voice symbol stream 194 into an outbound RF voice signal 88 in accordance with the cellular voice protocol. The RF section 190 is also coupled to convert an inbound RF data signal 82 into the inbound data symbol stream 204 and to convert the outbound data symbol stream 202 into an outbound RF data signal 86 in accordance with the cellular data protocol. The RF section 190 is further coupled to convert an inbound RF wireless network data signal 78 into the inbound wireless network data symbol stream 212 and to convert the outbound wireless network data symbol stream 210 into an outbound RF wireless network data signal 80 in accordance with the wireless network protocol.

In various uses of the IC 52, the voice baseband processing module 180, the data baseband processing module 182, the wireless network baseband processing module 184, and the RF section 190 may perform one or more of: converting the inbound RF voice signal 84 into an outbound wireless personal area network (WPAN) RF voice signal 80; converting the inbound RF voice signal 84 into an outbound wireless local area network (WLAN) RF voice signal 80; converting the inbound RF voice signal 84 into an inbound analog voice signal 106; converting the inbound RF data signal 82 into an outbound WPAN RF data signal 80; converting the inbound RF data signal 82 into an outbound WLAN RF data signal 80; converting the inbound RF data signal 82 into an inbound data display signal 114; converting an outbound RF WPAN signal 80 into an outbound RF voice signal 88; and converting an outbound RF WPAN signal 80 into an outbound RF WLAN signal 80.

Figure 8:
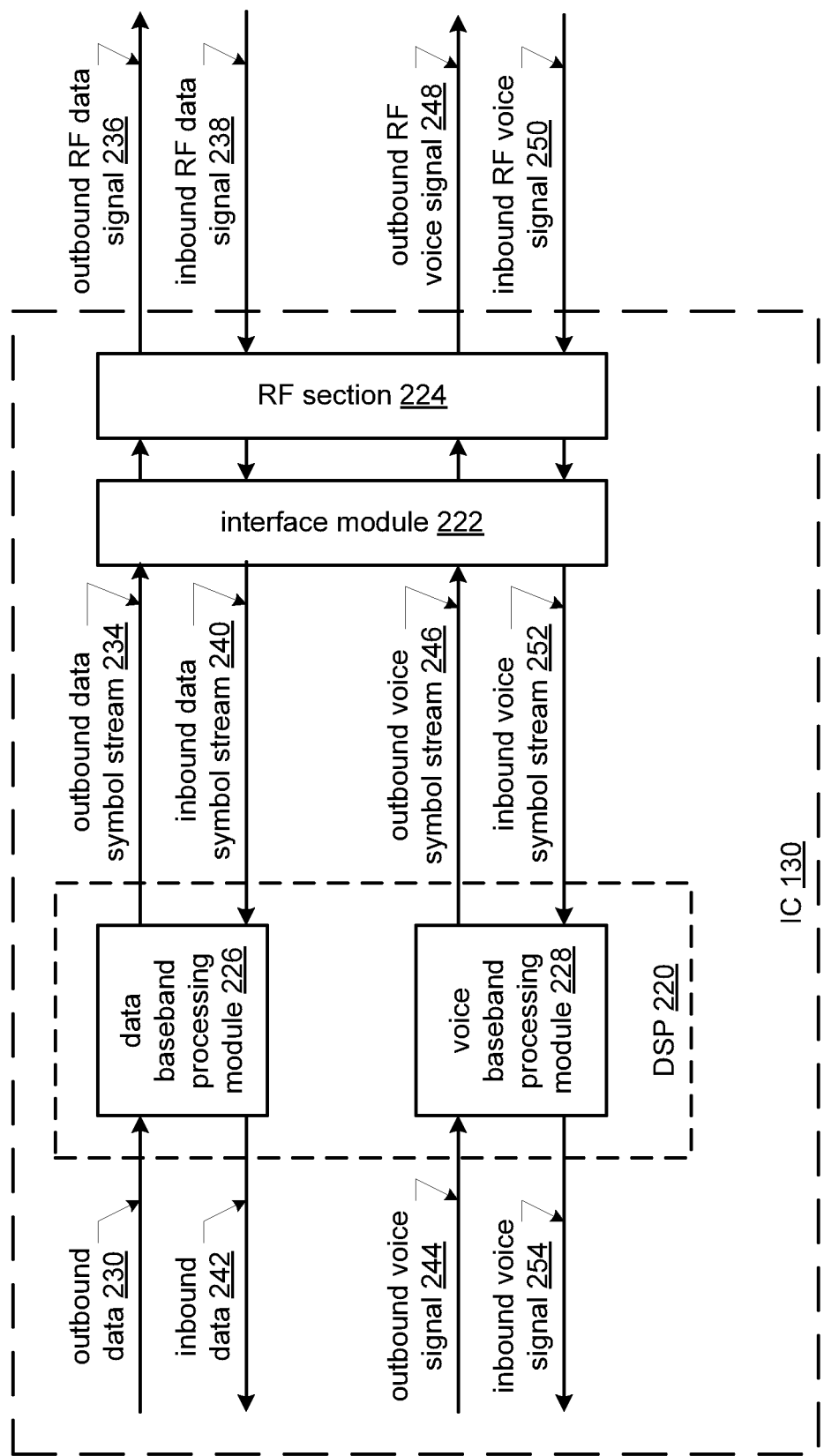
FIG. 8 is a schematic block diagram of an embodiment of an IC in accordance with the present invention.

FIG. 8 is a schematic block diagram of an embodiment of an IC 130 that includes a digital signal processor (DSP) 220, the interface module 222, and the RF section 224. The DSP 220 may be programmed to include a voice baseband processing module 228 and a data baseband processing module 226.

The voice baseband processing module 228 converts an outbound voice signal 242 into an outbound voice symbol stream 244 in accordance with one or more existing wireless communication standards, new wireless communication standards, modifications thereof, and/or extensions thereof (e.g., GSM, AMPS, digital AMPS, CDMA, etc.). The voice baseband processing module 228 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 242 into the outbound voice symbol stream 244. Depending on the desired formatting of the outbound voice symbol stream 244, the voice baseband processing module 228 may generate the outbound voice symbol stream 244 as Cartesian coordinates (e.g., having an in-phase signal component and a quadrature signal component to represent a symbol), as Polar or hybrid coordinates (e.g., having a phase component and an amplitude component to represent a symbol). The interface module 222 conveys the outbound voice symbol stream 244 to the RF section 224 when the IC 130 is in a voice mode.

The RF section 224 converts the outbound voice symbol stream 244 into an outbound RF voice signal 246 in accordance with the one or more existing wireless communication standards, new wireless communication standards, modifications thereof, and/or extensions thereof (e.g., GSM, AMPS, digital AMPS, CDMA, etc.). In one embodiment, the RF section 224 receives the outbound voice symbol stream 244 as Cartesian coordinates. In this embodiment, the RF section 224 mixes the in-phase components of the outbound voice symbol stream 244 with an in-phase local oscillation to produce a first mixed signal and mixes the quadrature components of the outbound voice symbol stream 244 with a quadrature local oscillation to produce a second mixed signal. The RF section 224 combines the first and second mixed signals to produce an up-converted voice signal. The RF section 224 then amplifies the up-converted voice signal to produce the outbound RF voice signal 246, which it provides to the antenna interface 140. Note that further power amplification may occur between the output of the RF section 224 and the input of the antenna interface 140.

In other embodiments, the RF section 224 receives the outbound voice symbol stream 244 as Polar or hybrid coordinates. In these embodiments, the RF section 224 modulates a local oscillator based on phase information of the outbound voice symbol stream 244 to produce a phase modulated RF signal. The RF section 224 then amplifies the phase modulated RF signal in accordance with amplitude information of the outbound voice symbol stream 244 to produce the outbound RF voice signal 246. Alternatively, the RF section 224 may amplify the phase modulated RF signal in accordance with a power level setting to produce the outbound RF voice signal 246.

For incoming voice signals, the RF section 224 converts the inbound RF voice signal 248 into an inbound voice symbol stream 250. In one embodiment, the RF section 224 extracts Cartesian coordinates from the inbound RF voice signal 248 to produce the inbound voice symbol stream 250. In another embodiment, the RF section 224 extracts Polar coordinates from the inbound RF voice signal 248 to produce the inbound voice symbol stream 250. In yet another embodiment, the RF section 224 extracts hybrid coordinates from the inbound RF voice signal 248 to produce the inbound voice symbol stream 250. The interface module 222 provides the inbound voice symbol stream 250 to the voice baseband processing module 228 when the IC 130 is in the voice mode.

The voice baseband processing module 228 converts the inbound voice symbol stream 250 into an inbound voice signal 252. The voice baseband processing module 228 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream 250 into the inbound voice signal 252.

For an outgoing data communication (e.g., email, text message, web browsing, and/or non-real-time data), the data baseband processing module 226 converts outbound data 230 into an outbound data symbol stream 232 in accordance with one or more existing wireless communication standards, new wireless communication standards, modifications thereof, and/or extensions thereof (e.g., EDGE, GPRS, HSDPA, HSUPA, etc.). The data baseband processing module 226 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 230 into the outbound data symbol stream 232. Depending on the desired formatting of the outbound data symbol stream 232, the data baseband processing module 226 may generate the outbound data symbol stream 232 as Cartesian coordinates, as Polar coordinates, or as hybrid coordinates.

The interface module 222 conveys the outbound data symbol stream 232 to the RF section 224 when the IC 130 is in a data mode. The data mode may be activated by the user of the communication device 50 by initiating a text message, by receiving a text message, by initiating a web browser function, by receiving a web browser response, by initiating a data file transfer, and/or by another data activation selection mechanism.

The RF section 224 converts the outbound data symbol stream 232 into an outbound RF data signal 234 in accordance with the one or more existing wireless communication standards, new wireless communication standards, modifications thereof, and/or extensions thereof (e.g., EDGE, GPRS, etc.). In one embodiment, the RF section 224 receives the outbound data symbol stream 232 as Cartesian coordinates. In this embodiment, the RF section 224 mixes the in-phase components of the outbound data symbol stream 232 with an in-phase local oscillation to produce a first mixed signal and mixes the quadrature components of the outbound data symbol stream 232 with a quadrature local oscillation to produce a second mixed signal. The RF section 224 combines the first and second mixed signals to produce an up-converted data signal. The RF section 224 then amplifies the up-converted data signal to produce the outbound RF data signal 234, which it provides to the antenna interface 140. Note that further power amplification may occur between the output of the RF section 224 and the input of the antenna interface 140.

In other embodiments, the RF section 224 receives the outbound data symbol stream 232 as Polar or hybrid coordinates. In these embodiments, the RF section 224 modulates a local oscillator based on phase information of the outbound data symbol stream 232 to produce a phase modulated RF signal. The RF section 224 then amplifies the phase modulated RF signal in accordance with amplitude information of the outbound data symbol stream 232 to produce the outbound RF data signal 234. Alternatively, the RF section 224 may amplify the phase modulated RF signal in accordance with a power level setting to produce the outbound RF data signal 234.

For incoming data communications, the RF section 224 converts the inbound RF data signal 236 into an inbound data symbol stream 238. In one embodiment, the RF section 224 extracts Cartesian coordinates from the inbound RF data signal 236 to produce the inbound data symbol stream 238. In another embodiment, the RF section 224 extracts Polar coordinates from the inbound RF data signal 236 to produce the inbound data symbol stream 238. In yet another embodiment, the RF section 224 extracts hybrid coordinates from the inbound RF data signal 236 to produce the inbound data symbol stream 238. The interface module 222 provides the inbound data symbol stream 238 to the data baseband processing module 226 when the IC 130 is in the data mode.

The data baseband processing module 226 converts the inbound data symbol stream 238 into inbound data 240. The data baseband processing module 226 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 238 into the inbound data 240.

Figure 9:
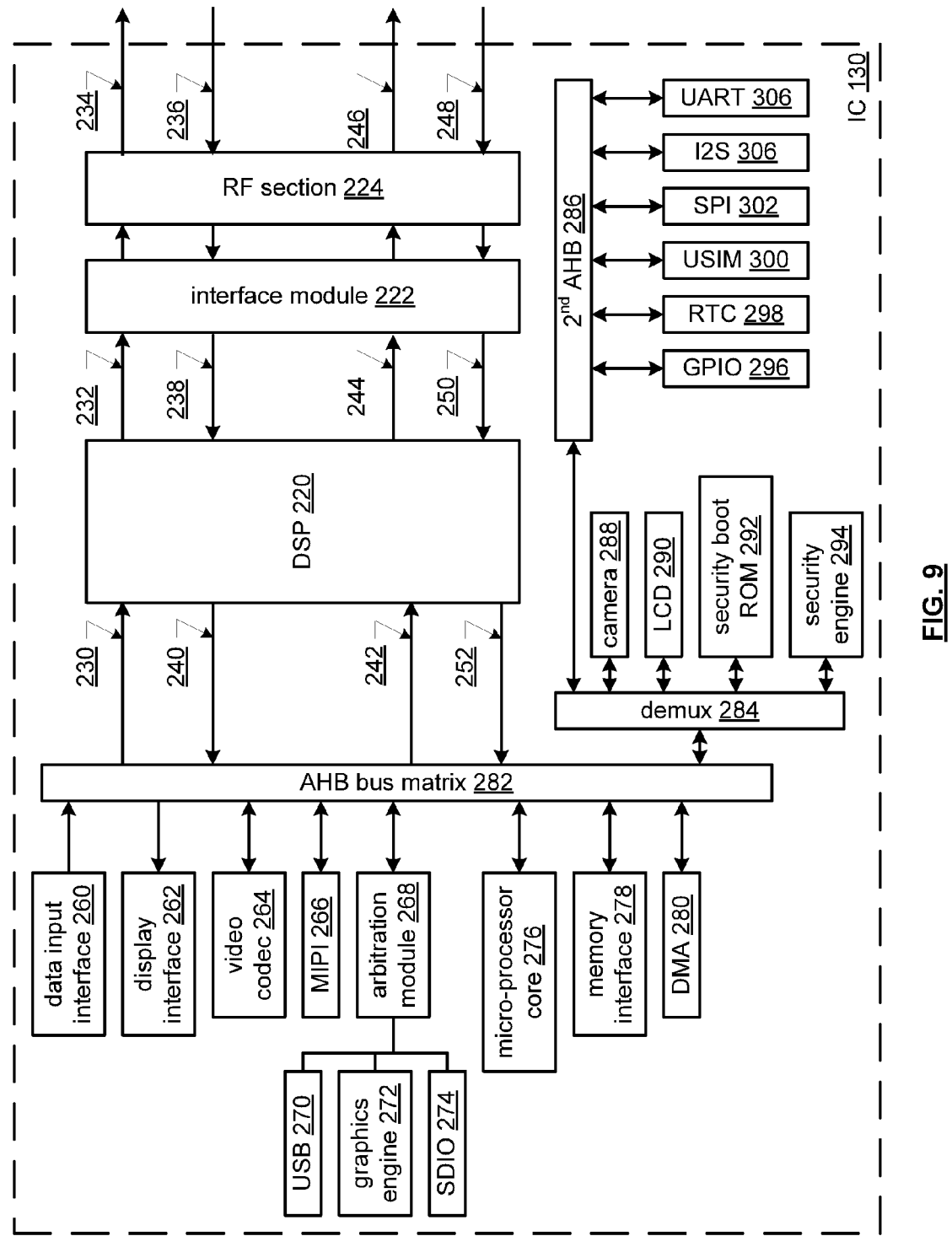
FIG. 9 is a schematic block diagram of another embodiment of an IC in accordance with the present invention.

FIG. 9 is a schematic block diagram of another embodiment of an IC 130 that includes the RF section 224, the interface module 222, the DSP 220, the AHB bus matrix 282, the microprocessor core 276, the memory interface 278, the data input interface 262, the display interface 262, the video codec 264, the mobile industry processor interface (MIPI) interface 266, an arbitration module 268, a direct memory access (DMA) 280, a demultiplexer 284, a security engine 294, a security boot ROM 292, an LCD interface 290, a camera interface 288, a $2^{nd}$ AHB bus 286, a real time clock (RTC) module 298, a general purpose input/output (GPIO) interface 296, a Universal Asynchronous Receiver-Transmitter (UART) interface 306, a Serial Peripheral Interface (SPI) interface 302, and an I2S interface 304. The arbitration module 268 is coupled to the SDIO interface 274, a universal serial bus (USB) interface 270, and a graphics engine 272.

In this embodiment, the arbitration module 268 arbitrates access to the AHB bus matrix 282 between the SDIO interface 274, a universal serial bus (USB) interface 270, and a graphics engine 272. The graphics engine 272 is operable to generate two-dimensional and/or three-dimensional graphic images for display and/or for transmission as outbound data. In addition, the graphics engine 272 may process inbound data to produce two-dimensional and/or three-dimensional graphic images for display and/or storage.

Figure 10:
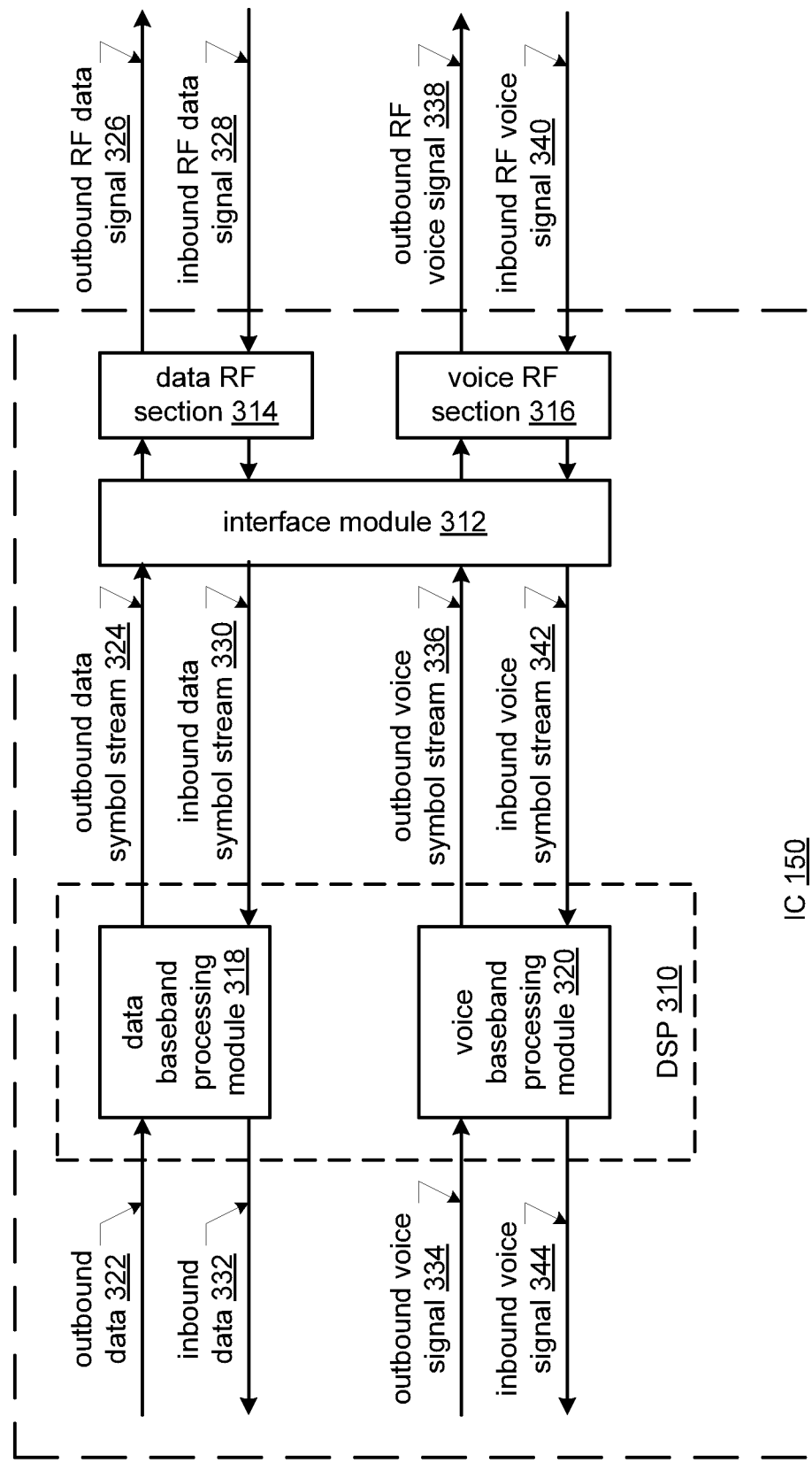
FIG. 10 is a schematic block diagram of another embodiment of an IC in accordance with the present invention.

FIG. 10 is a schematic block diagram of another embodiment of an IC 150 that includes a digital signal processor (DSP) 310, an interface module 312, a data RF section 314, and a voice RF section 316. The DSP 310 may be programmed to include a voice baseband processing module 320 and a data baseband processing module 318.

The voice baseband processing module 320 converts an outbound voice signal 334 into an outbound voice symbol stream 336 in accordance with one or more existing wireless communication standards, new wireless communication standards, modifications thereof, and/or extensions thereof (e.g., WCDMA, etc.) corresponding to a second frequency band ($fb_2$). The voice baseband processing module 320 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 334 into the outbound voice symbol stream 336. Depending on the desired formatting of the outbound voice symbol stream 336, the voice baseband processing module 320 may generate the outbound voice symbol stream 336 as Cartesian coordinates (e.g., having an in-phase signal component and a quadrature signal component to represent a symbol) and/or as Polar or hybrid coordinates (e.g., having a phase component and an amplitude component to represent a symbol).

The interface module 312 conveys the outbound voice symbol stream 336 to the voice RF section 316 when the IC 150 is in a voice mode. The voice mode may be activated by the user of the communication device 50 by initiating a cellular telephone call, by receiving a cellular telephone call, by initiating a walkie-talkie type call, by receiving a walkie-talkie type call, by initiating a voice record function, and/or by another voice activation selection mechanism.

The voice RF section 316 converts the outbound voice symbol stream 336 into an outbound RF voice signal 338 in accordance with the one or more existing wireless communication standards, new wireless communication standards, modifications thereof, and/or extensions thereof (e.g., WCDMA, etc.), where the outbound RF voice signal 338 has a carrier frequency in the second frequency band (e.g., 1920-1980 MHz). In one embodiment, the voice RF section 316 receives the outbound voice symbol stream 336 as Cartesian coordinates. In this embodiment, the voice RF section 316 mixes the in-phase components of the outbound voice symbol stream 336 with an in-phase local oscillation to produce a first mixed signal and mixes the quadrature components of the outbound voice symbol stream 336 with a quadrature local oscillation to produce a second mixed signal. The voice RF section 316 combines the first and second mixed signals to produce an up-converted voice signal. The voice RF section 316 then amplifies the up-converted voice signal to produce the outbound RF voice signal 338. Note that further power amplification may occur after the output of the voice RF section 316.

In other embodiments, the voice RF section 316 receives the outbound voice symbol stream 336 as Polar or hybrid coordinates. In these embodiments, the voice RF section 316 modulates a local oscillator based on phase information of the outbound voice symbol stream 336 to produce a phase modulated RF signal. The voice RF section 316 then amplifies the phase modulated RF signal in accordance with amplitude information of the outbound voice symbol stream 336 to produce the outbound RF voice signal 338. Alternatively, the voice RF section 316 may amplify the phase modulated RF signal in accordance with a power level setting to produce the outbound RF voice signal 338.

For incoming voice signals, the voice RF section 316 converts the inbound RF voice signal 340, which has a carrier frequency in the second frequency band (e.g., 2110-2170 MHz) into an inbound voice symbol stream 342. In one embodiment, the voice RF section 316 extracts Cartesian coordinates from the inbound RF voice signal 340 to produce the inbound voice symbol stream 342. In another embodiment, the voice RF section 316 extracts Polar coordinates from the inbound RF voice signal 340 to produce the inbound voice symbol stream 342. In yet another embodiment, the voice RF section 316 extracts hybrid coordinates from the inbound RF voice signal 340 to produce the inbound voice symbol stream 342. The interface module 312 provides the inbound voice symbol stream 342 to the voice baseband processing module 320 when the IC 150 is in the voice mode.

The voice baseband processing module 320 converts the inbound voice symbol stream 342 into an inbound voice signal 344. The voice baseband processing module 320 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream 342 into the inbound voice signal 344.

For an outgoing data communication (e.g., email, text message, web browsing, and/or non-real-time data), the data baseband processing module 318 converts outbound data 322 into an outbound data symbol stream 324 in accordance with one or more existing wireless communication standards, new wireless communication standards, modifications thereof, and/or extensions thereof (e.g., EDGE, GPRS, etc.) corresponding to a first frequency band ($fb_1$). The data baseband processing module 318 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 322 into the outbound data symbol stream 324. Depending on the desired formatting of the outbound data symbol stream 324, the data baseband processing module 318 may generate the outbound data symbol stream 324 as Cartesian coordinates, as Polar coordinates, or as hybrid coordinates.

The interface module 312 conveys the outbound data symbol stream 324 to the data RF section 314 when the IC 150 is in a data mode. The data mode may be activated by the user of the communication device 30 by initiating a text message, by receiving a text message, by initiating a web browser function, by receiving a web browser response, by initiating a data file transfer, and/or by another data activation selection mechanism.

The data RF section 314 converts the outbound data symbol stream 324 into an outbound RF data signal 326 having a carrier frequency in the first frequency band (e.g., 890-915 MHz) in accordance with the one or more existing wireless communication standards, new wireless communication standards, modifications thereof, and/or extensions thereof (e.g., EDGE, GPRS, etc.). In one embodiment, the data RF section 314 receives the outbound data symbol stream 324 as Cartesian coordinates. In this embodiment, the data RF section 314 mixes the in-phase components of the outbound data symbol stream 324 with an in-phase local oscillation to produce a first mixed signal and mixes the quadrature components of the outbound data symbol stream 324 with a quadrature local oscillation to produce a second mixed signal. The data RF section 314 combines the first and second mixed signals to produce an up-converted data signal. The data RF section 236 then amplifies the up-converted data signal to produce the outbound RF data signal 326. Note that further power amplification may occur after the output of the data RF section 314.

In other embodiments, the data RF section 314 receives the outbound data symbol stream 324 as Polar or hybrid coordinates. In these embodiments, the data RF section 314 modulates a local oscillator based on phase information of the outbound data symbol stream 324 to produce a phase modulated RF signal. The data RF section 314 then amplifies the phase modulated RF signal in accordance with amplitude information of the outbound data symbol stream 324 to produce the outbound RF data signal 326. Alternatively, the data RF section 314 may amplify the phase modulated RF signal in accordance with a power level setting to produce the outbound RF data signal 326.

For incoming data communications, the data RF section 314 converts the inbound RF data signal 328, which has a carrier frequency in the first frequency band (e.g., 890-915 MHz) into an inbound data symbol stream 330. In one embodiment, the data RF section 314 extracts Cartesian coordinates from the inbound RF data signal 328 to produce the inbound data symbol stream 330. In another embodiment, the data RF section 314 extracts Polar coordinates from the inbound RF data signal 328 to produce the inbound data symbol stream 330. In yet another embodiment, the data RF section 314 extracts hybrid coordinates from the inbound RF data signal 328 to produce the inbound data symbol stream 330. The interface module 312 provides the inbound data symbol stream 330 to the data baseband processing module 318 when the IC 150 is in the data mode.

The data baseband processing module 318 converts the inbound data symbol stream 330 into inbound data 332. The data baseband processing module 318 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 330 into the inbound data 332.

Figure 11:
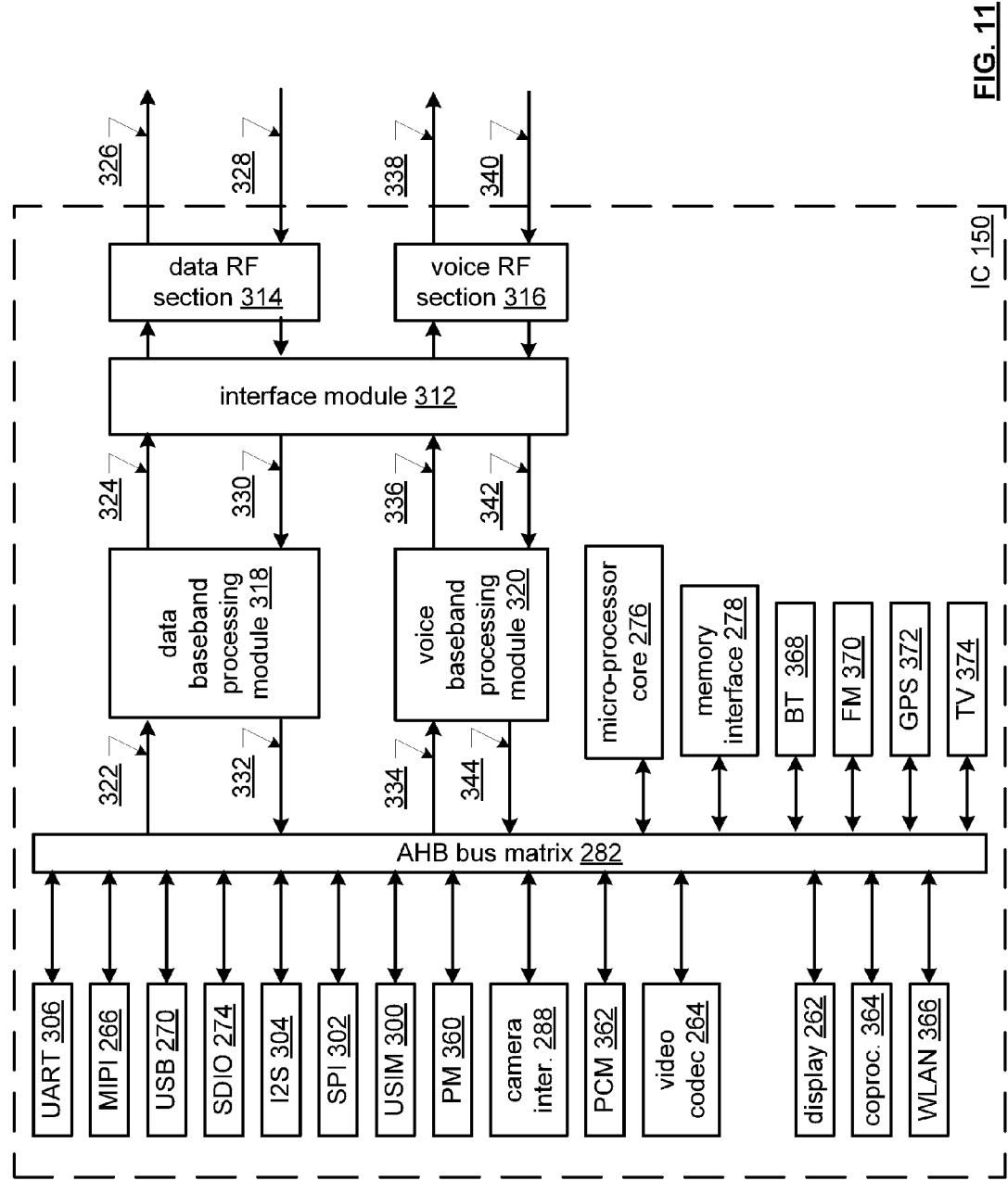
FIG. 11 is a schematic block diagram of another embodiment of an IC in accordance with the present invention.

FIG. 11 is a schematic block diagram of another embodiment of an IC 150 that includes the data RF section 314, the voice RF section 316, the interface module 312, the voice baseband processing module 320, the data baseband processing module 318, the AHB bus matrix 282, the microprocessor core 276, the memory interface 278, and one or more of a plurality of interface modules. The plurality of interface modules includes the mobile industry processor interface (MIPI) interface 266, the universal serial bus (USB) interface 270, the secure digital input/output (SDIO) interface 274, the I2S interface 304, the Universal Asynchronous Receiver-Transmitter (UART) interface 306, the Serial Peripheral Interface (SPI) interface 302, the power management (PM) interface 360, the universal subscriber identity module (USIM) interface 300, the camera interface 288, the pulse code modulation (PCM) interface 362, the video codec 264, the second display interface 262, the coprocessor interface 364, the WLAN interface 366, the Bluetooth interface 368, the FM interface 370, the GPS interface 372, and the TV interface 374.

Figure 12:
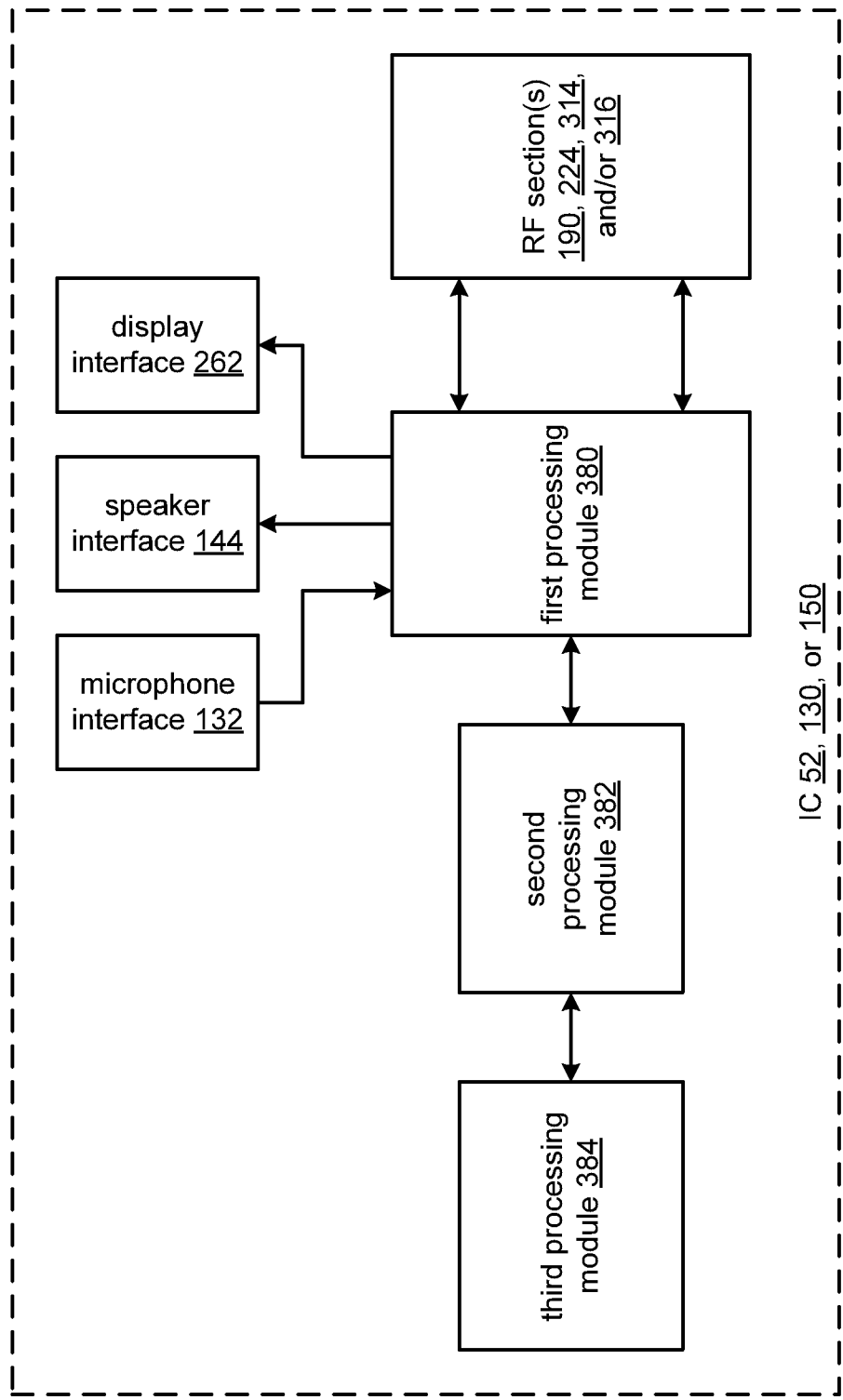
FIG. 12 is a schematic block diagram of another embodiment of an IC in accordance with the present invention.

FIG. 12 is a schematic block diagram of another embodiment of an IC 52, 130, and/or 150 that includes one or more RF sections 190, 224, 314, and/or 316, a first processing module 380, a second processing module 382, a third processing module 384, the microphone interface 132, the speaker interface 144, and the display interface 262. The first processing module 382 may include one or more baseband sections 180, 182, 184, 226, 228, 318, and/or 320. The first, second, and third processing modules may be each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-14. In an embodiment, the first processing module 380 is a digital signal processor (DSP), the second processing module is a first type of microprocessor (e.g., ARMv5), and the third processing module 384 may be a second type of microprocessor (e.g., ARMv6 or ARMv7). In such an embodiment, the second type of microprocessor is faster and consumes more power than the second type of microprocessor.

In general, the first processing module 380 (e.g., a DSP) performs the physical layer of a communication protocol stack and the audio and/or video codec function for the IC; the second processing module 382 performs the remainder of the communication protocol stack; and the third processing module 384 performs the operating system and user applications. In an embodiment, the third processing module 384 may be a high speed processor and a high power consumption processor with respect to the second processing module 382 such that, once the third processing module 384 establishes a wireless communication, it can be shut off and the second processing module 382 processes the wireless communication without the third processing module 384. In this instance, power consumption is reduced by shutting off the third processing module or placing it in a sleep mode.

In an embodiment, the RF section converts an outbound symbol stream into an outbound RF signal and converts an inbound RF signal into an inbound symbol stream. The digital signal processor converts outbound data into the outbound symbol stream and converts the inbound symbol stream into inbound data in accordance with a physical layer of a wireless communication protocol (e.g., EDGE, GSM, GPRS, WCDMA, HSDPA, HSUPA, IEEE 802.11, Bluetooth, ZigBee, etc.). In addition, the digital signal processor may convert an outbound analog audio signal into an outbound digital audio signal and may convert an inbound digital audio signal into an inbound analog audio signal.

The second processing module 382 converts the inbound data into an inbound signal and converts an outbound signal into the outbound data in accordance with upper layers of the wireless communication protocol. Note that the inbound data may include an inbound digital video signal, an inbound digital image signal, an inbound digital text signal, an inbound digital graphics signal, and the inbound digital audio signal and the outbound signal may include an outbound digital audio signal, an outbound digital video signal, an outbound digital image signal, an outbound digital text signal, and/or an outbound digital graphics signal.

The third processing module 384 performs one or more user applications that processing (e.g., generate, modify, utilize, convert, store, update, etc.) the inbound signal and/or the outbound signal. Such a user application may be a digital image capture algorithm, a digital image display algorithm, a video capture algorithm, a video display algorithm, a voice compression algorithm, a voice decompression algorithm, an audio capture algorithm, an audio playback algorithm, a web browser algorithm, an email algorithm, a text message algorithm, and/or a cellular telephony algorithm.

In addition, the third processing module 384 performs an operating system algorithm to manage the hardware and software resources of wireless communication device. In general, the operating system controls allocation of memory, manage processes (e.g., coordinates operation of the one or more user applications), prioritizing system requests, controls input and output devices, facilitates networking and managing file systems, and security functions. In addition, the operating system includes a user interface application (e.g., a graphical user interface) for ease of operation.

Figure 13:
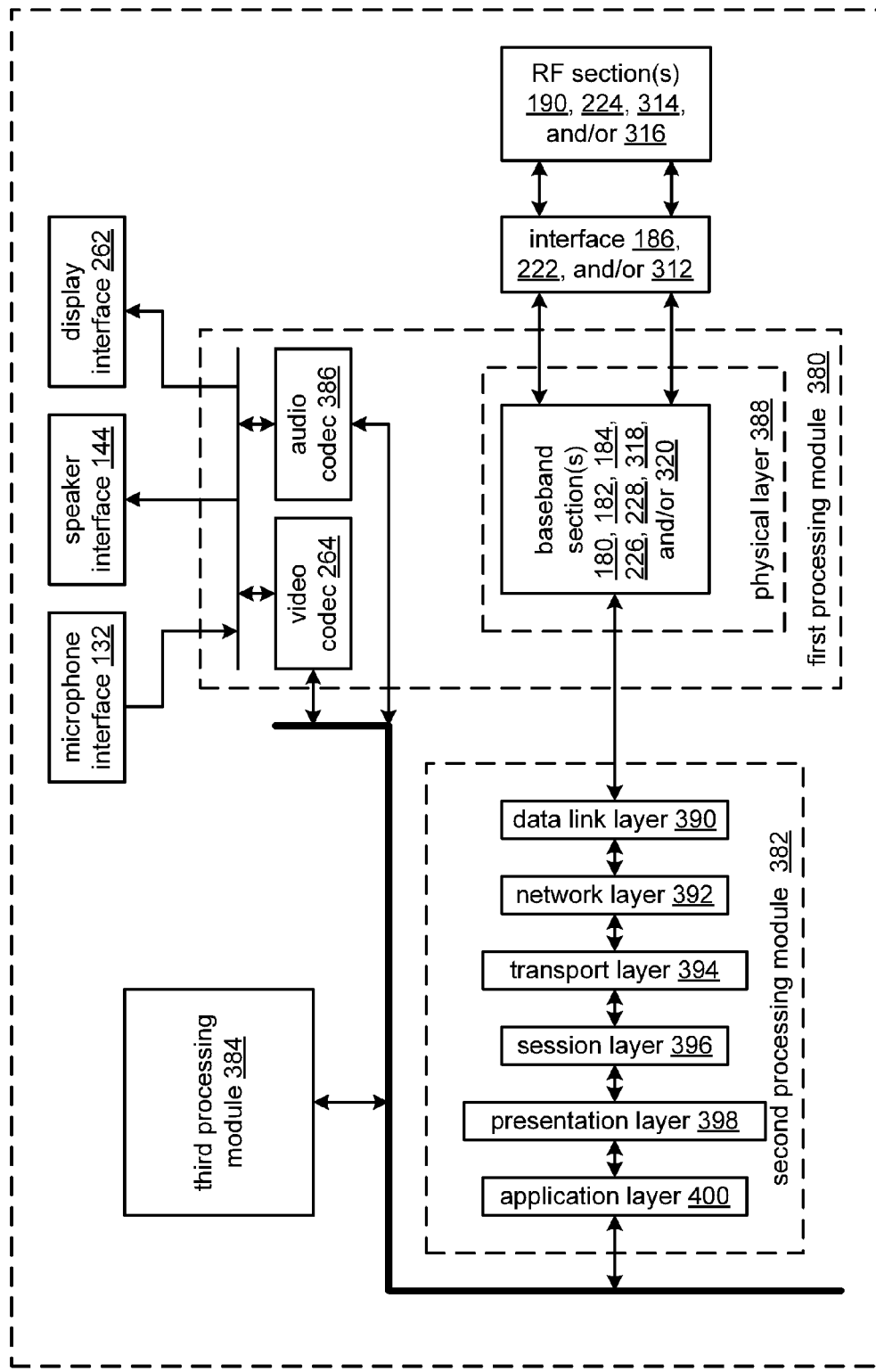
FIG. 13 is a schematic block diagram of another embodiment of an IC in accordance with the present invention.

FIG. 13 is a schematic block diagram of another embodiment of an IC 52, 130, and/or 150 that includes one or more RF sections 190, 224, 314, and/or 316, an interface module 186, 222, and/or 312, the first processing module 380, the second processing module 382, the third processing module 384, the microphone interface 132, the speaker interface 144, and the display interface 262. The first processing module 380 may include one or more baseband sections 180, 182, 184, 226, 228, 318, and/or 320, an audio codec 386, and may further include a video codec 264. The second processing module 382 is configured to provide a data link layer module 390, a network layer module 392, a transport layer module 394, a session layer module 396, a presentation layer module 398, and an application layer module 400. The third processing module 384 functions as previously described.

As an example, assume that the IC 52, 130, and/or 150 is programmed for a GSM voice wireless communication. In this example, the third processing module 384 would initiate the GSM voice communication and, once initiated, the third processing module 384 would be disabled and/or placed in a low power state. For outgoing voice communications, the microphone interface 132 would receive an analog audio signal from a microphone, amplify and/or filter the signal and provide the amplified and/or filtered signal to the audio codec 386. The audio codec 386 would convert the analog signal into a digital signal.

The second processing module 382, via the upper layers of the communication protocol stack 380-400, converts the digital signal into outbound data. The baseband section converts the outbound data into an outbound symbol stream in accordance with a corresponding GSM standard. The interface provides the outbound symbol stream to the RF section, which converts the outbound symbol stream into an outbound RF signal.

For incoming communications, the RF section converts an inbound RF signal into an inbound symbol stream in accordance with the GSM standard. The baseband section converts the inbound symbol stream into inbound data in accordance with the GSM standard. The second processing module 382, via the upper layers of the communication stack, converts the inbound data into an inbound digital signal. The audio codec 386 converts the inbound digital signal into an analog signal, which is provided to the speaker interface 144. The speaker interface 144 amplifies and/or filters the analog signal and provides the amplified and/or filtered signal to one or more speakers.

Figure 14:
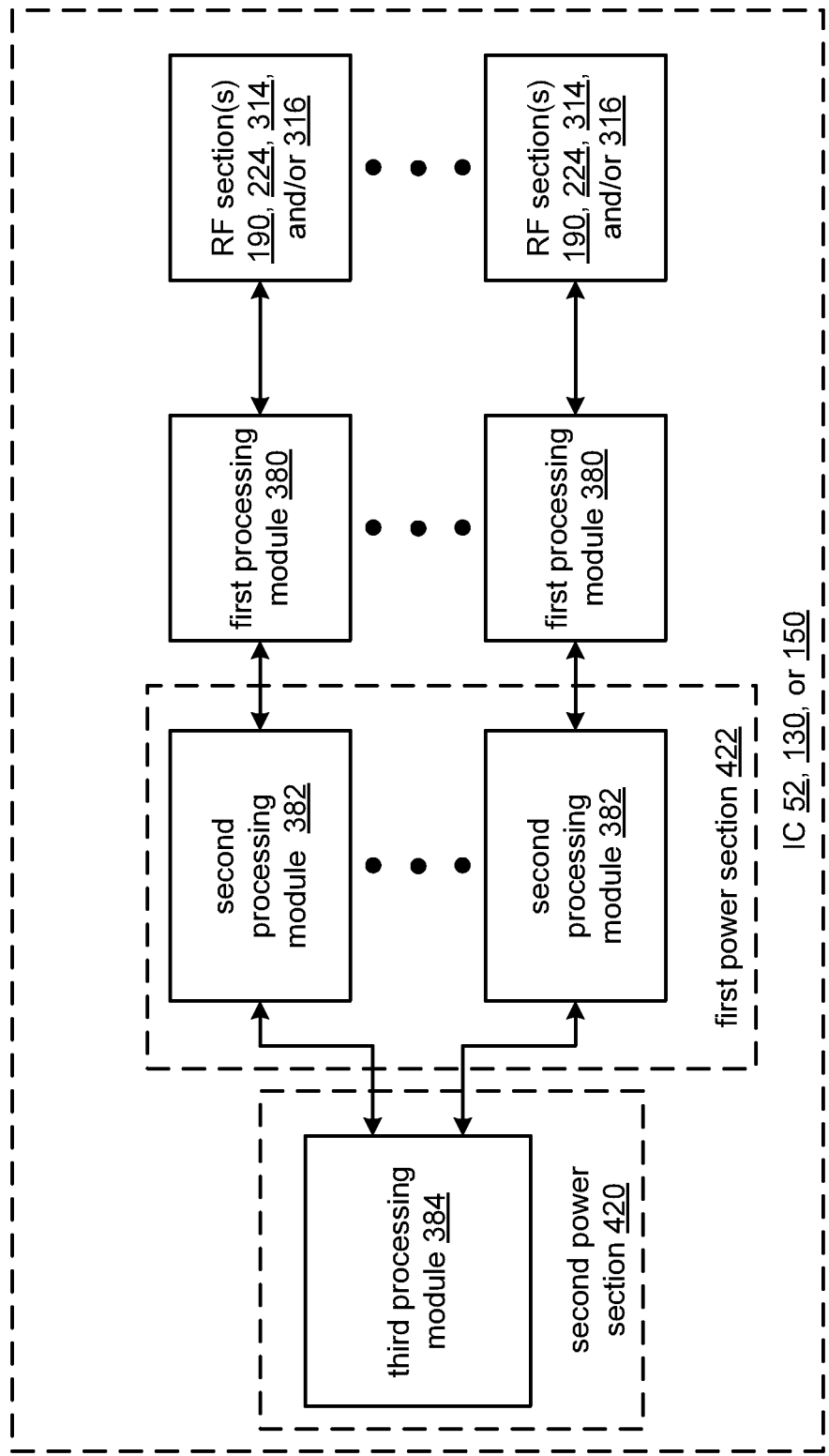
FIG. 14 is a schematic block diagram of another embodiment of an IC in accordance with the present invention.

FIG. 14 is a schematic block diagram of another embodiment of an IC 52, 130, and/or 150 that includes a plurality of RF sections 190, 224, 314, and/or 316, a plurality of first processing modules 380, a plurality of second processing modules 382, and a third processing module 384. In general, a first processing module 380 performs the physical layer of a communication protocol stack of a corresponding wireless communication protocol and may further perform the audio and/or video codec function for the IC. A second processing module 382 performs the remainder of the communication protocol stack of the corresponding wireless communication protocol. The third processing module 384 performs the operating system and one or more user applications. In such an embodiment, the third processing module 384 may be a high speed processor and a high power consumption processor with respect to the second processing module 382 such that, once the third processing module 384 establishes a wireless communication, it can be shut off or placed in a low power mode and one or more of the second processing modules 382 processes the wireless communication without the third processing module 384. For instance, the second processing modules 382 may be within a first power section 422 and the third processing module 384 may be in a second power section 420, where the second power section 420 is disabled (e.g., power removed) such that the third processing module 384 is disabled.

In an embodiment, each of the plurality of RF sections converts an outbound symbol stream into an outbound RF signal and converts an inbound RF signal into an inbound symbol stream in accordance with a corresponding wireless communication protocol. Each of the plurality of baseband sections converts outbound data into the outbound symbol stream for a corresponding one of the RF sections and converts the inbound symbol stream from the corresponding one of the RF sections into inbound data. In addition, each of the first processing modules converts an outbound analog audio signal into an outbound digital audio signal and converts an inbound digital audio signal into an inbound analog audio signal Each of the plurality of second processing modules is coupled to a corresponding one of the plurality of first processing modules and is coupled to convert the inbound data into the inbound digital audio signal in accordance with the corresponding wireless communication protocol and convert the outbound digital audio signal into the outbound data in accordance with the corresponding wireless communication protocol.

The third processing module performs a user application that includes at least one of generation of the inbound analog audio signal and generation of the outbound analog audio signal. In addition, the second-type processor performs an operating system algorithm to coordinate operation of the user application. In an embodiment, each of the plurality of first-type of processors have a first operating speed and a first power consumption and the second-type processor has a second operating speed and a second power consumption, wherein the second operating speed is greater than the first operating speed and the second power consumption is greater than the first power consumption.

In another embodiment, a first RF section of the plurality of RF sections convert a first outbound symbol stream into a first outbound RF signal in accordance with a first wireless communication protocol (e.g., GSM, EDGE, GPRS, etc.) and converts a first inbound RF signal into a first inbound symbol stream in accordance with the first wireless communication protocol. In addition, a second RF section of the plurality of RF sections converts a second outbound symbol stream into a second outbound RF signal in accordance with a second wireless communication protocol (e.g., WCDMA, HSDPA, HSUPA, etc.) and converts a second inbound RF signal into a second inbound symbol stream in accordance with the second wireless communication protocol.

A first one of the plurality of first processing modules converts first outbound data into the first outbound symbol stream in accordance with the first wireless communication protocol and converts the first inbound symbol stream into first inbound data in accordance with the first wireless communication protocol. The first one of the plurality of first processing modules may perform the conversions in accordance with a physical layer of a first communication stack of the first wireless communication protocol. A second one of the plurality of first processing modules converts second outbound data into the second outbound symbol stream in accordance with the second wireless communication protocol and converts the second inbound symbol stream into second inbound data in accordance with the second wireless communication protocol. The second one of the plurality of first processing modules may perform the conversions in accordance with a physical layer of a second communication stack of the second wireless communication protocol.

A first one of the plurality of second processing modules converts the first inbound data into a first inbound signal and converts a first outbound signal into the first outbound data. This may be done in accordance with remaining layers of the first communication stack. A second one of the plurality of second processing modules converts the second inbound data into a second inbound signal and converts a second outbound signal into the second outbound data. This may be done in accordance with remaining layers of the second communication stack.

The third processing module performs a first user application that processes at least one the first inbound signal and the first outbound signal. In addition, the third processing module 384 performs a second user application that processes at least one the second inbound signal and the second outbound signal. Still further, the third processing module 384 performs an operating system algorithm to coordinate operation of the user application.

From embodiment to embodiment as discussed above, an IC included certain features and/or components. It should be noted that an IC may include any combination of components of the embodiments illustrated in the preceding figures and/or may further include conventional components of wireless communication ICs. Further embodiments and/or combination of embodiments are disclosed in co-pending patent application entitled VOICE/DATA/RF INTEGRATED CIRCUIT, having a filing date of Dec. 19, 2006, and a Ser. No. 11/641,999, now issued as U.S. Pat. No. 8,374,225, on Feb. 12, 2013, and of co-pending patent application entitled VOICE DATA RF WIRELESS NETWORK IC, having a filing date of Feb. 6, 2007, and a Ser. No. 11/711,126, now issued as U.S. Pat. No. 7,957,457 on Jun. 7, 2011, both of which are incorporated herein by reference.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that a first signal has a greater magnitude than a second signal, a favorable comparison may be achieved when the magnitude of the first signal is greater than that of the second signal or when the magnitude of second signal is less than that of the first signal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprises:
  a first processing module configured to function as a first portion of a communication stack of a corresponding wireless communication protocol to produce an outbound wireless symbol stream, to convert an inbound signal into an inbound symbol stream, and to perform a codec function;
  a second processing module configured to function as a remaining portion of the communication stack of the corresponding wireless communication protocol to produce outbound wireless network data to the first processing module to produce the outbound wireless symbol stream from outbound data, and to produce an inbound signal from inbound data from the first processing module based upon the inbound symbol stream;
a third processing module configured to:
perform a user application that processes at least one of the inbound signal and an outbound signal; and
perform an operating system algorithm to coordinate an operation of the user application.

2. The IC of claim 1, wherein the first processing module is further configured to:
convert the outbound wireless network data into the outbound wireless symbol stream;
convert an outbound analog audio signal into at least a portion of the outbound signal; and
convert at least a portion of the inbound signal into an inbound analog audio signal.

3. The IC of claim 2, wherein the second processing module is further configured to:
convert the outbound signal into the outbound wireless network data; and
convert the inbound data into the inbound signal.

4. The IC of claim 1, wherein:
the inbound symbol stream is based upon at least one of an inbound digital video signal, an inbound digital image signal, an inbound digital text signal, an inbound digital graphics signal, and an inbound digital audio signal; and
the outbound wireless network data is correspondingly processed to produce at least one of an outbound digital audio signal, an outbound digital video signal, an outbound digital image signal, an outbound digital text signal, and an outbound digital graphics signal.

5. The IC of claim 4, wherein the at least one user application comprises at least one of:
a digital image capture algorithm;
a digital image display algorithm;
a video capture algorithm;
a video display algorithm;
a voice compression algorithm;
a voice decompression algorithm;
an audio capture algorithm;
an audio playback algorithm;
a web browser algorithm;
an email algorithm;
a text message algorithm; and
a cellular telephony algorithm.

6. The IC of claim 1, wherein the third processing module is further configured to:
perform a plurality of user applications; and
perform the operating system algorithm to coordinate operation of the plurality of user applications.

7. The IC of claim 1 wherein the first portion of the communication stack includes a physical layer of the communication stack.

8. The IC of claim 7 comprises:
the third processing module being placed in a low power mode after a wireless communication is established pursuant to the corresponding wireless communication protocol.

9. An integrated circuit (IC) comprises:
a plurality of first processing modules, wherein a first processing module of the plurality of first processing modules is configured to convert outbound data into an outbound symbol stream in accordance with a first portion of a communication stack of a wireless communication protocol, and convert an inbound symbol stream into inbound data;
a plurality of second processing modules, wherein a second processing module of the plurality of second processing modules configured at a first operating speed and a first power consumption, the second processing module is further configured to convert the inbound data into an inbound signal, in accordance with a remaining portion of the communication stack the wireless communication protocol, and convert an outbound signal into the outbound data; and
a third processing module configured at a second operating speed and a second power consumption, wherein the second operating speed is greater than the first operating speed and the second power consumption is different from the first power consumption, the third processing module further configured to perform at least one user application that processes at least one of the inbound signal and the outbound signal.

10. The IC of claim 9 further comprises:
at least one first power section to power at least one of the plurality of second processing modules; and
a second power section to power the third processing module, wherein the second power section is selectively placed in an on and an off state based upon a need of the third processing module.

11. The IC of claim 9 comprises:
the inbound signal including at least one of an inbound digital video signal, an inbound digital image signal, an inbound digital text signal, an inbound digital graphics signal, and an inbound digital audio signal; and
the outbound signal including at least one of an outbound digital audio signal, an outbound digital video signal, an outbound digital image signal, an outbound digital text signal, and an outbound digital graphics signal.

12. The IC of claim 9, wherein the at least one user application comprises at least one of:
a digital image capture algorithm;
a digital image display algorithm;
a video capture algorithm;
a video display algorithm;
a voice compression algorithm;
a voice decompression algorithm;
an audio capture algorithm;
an audio playback algorithm;
a web browser algorithm;
an email algorithm;
text message algorithm; and
a cellular telephony algorithm.

13. The IC of claim 9, wherein the second processing module is further configured to:
convert an outbound analog audio signal into at least a portion of the outbound signal; and
convert at least a portion of the inbound signal into an inbound analog audio signal.

14. The IC of claim 9 wherein the first portion of the communication stack includes a physical layer of the communication stack.

15. An integrated circuit (IC) comprises:
a digital signal processor configured, in accordance with a first portion of a communication stack of a wireless communication protocol, to:
convert outbound data into an outbound symbol stream;
convert an inbound symbol stream into inbound data;
convert an outbound analog audio signal into an outbound digital audio signal; and
convert an inbound digital audio signal into an inbound analog audio signal;

a first processor configured to, in accordance with a remaining portion of the communication stack of the wireless communication protocol:
  convert the inbound data into the inbound digital audio signal; and
  convert the outbound digital audio signal into the outbound data; and
a second processor configured to:
  perform a user application that includes at least one of generation of the inbound analog audio signal and generation of the outbound analog audio signal; and
  perform an operating system algorithm to coordinate operation of the user application.

16. The IC of claim 15, wherein the first processor is further configured to:
  convert the inbound data into at least one of an inbound digital video signal, an inbound digital image signal, an inbound digital text signal, an inbound digital graphics signal, and the inbound digital audio signal; and
  convert at least one of the outbound digital audio signal, an outbound digital video signal, an outbound digital image signal, an outbound digital text signal, and an outbound digital graphics signal into the outbound data.

17. The IC of claim 15, wherein the second processor further functions to:
  perform a plurality of user applications; and
  perform the operating system algorithm to coordinate operation of the plurality of user applications.

18. The IC of claim 15 wherein the first portion of the communication stack includes a physical layer of the communication stack.

19. The IC of claim 15 comprises:
  the second processor being placed in a low power mode after a wireless communication is established pursuant to the wireless communication protocol.

20. The IC of claim 15, wherein the user application comprises at least one of:
  a digital image capture algorithm;
  a digital image display algorithm;
  a video capture algorithm;
  a video display algorithm;
  a voice compression algorithm;
  a voice decompression algorithm;
  an audio capture algorithm;
  an audio playback algorithm;
  a web browser algorithm;
  an email algorithm;
  text message algorithm; and
  a cellular telephony algorithm.

* * * * *

UNITED STATES PATENT AND TRADEMARK OFFICE
CERTIFICATE OF CORRECTION

| | | |
|---|---|---|
| PATENT NO. | : 8,731,604 B2 | Page 1 of 1 |
| APPLICATION NO. | : 13/614029 | |
| DATED | : May 20, 2014 | |
| INVENTOR(S) | : Rofougaran et al. | |

It is certified that error appears in the above-identified patent and that said Letters Patent is hereby corrected as shown below:

On the Title Page, Item [63] Related U.S. Application Data: replace "12/315,312" with --13/215,312--

Signed and Sealed this
Twentieth Day of January, 2015

Michelle K. Lee
*Deputy Director of the United States Patent and Trademark Office*